US012562115B2

(12) United States Patent
Yuan

(10) Patent No.: US 12,562,115 B2
(45) Date of Patent: Feb. 24, 2026

(54) DISPLAY PANEL AND DISPLAY DEVICE

(71) Applicant: Xiamen Tianma Display Technology Co., Ltd., Xiamen (CN)

(72) Inventor: Yong Yuan, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/805,754

(22) Filed: Aug. 15, 2024

(65) Prior Publication Data

US 2025/0054445 A1 Feb. 13, 2025

(30) Foreign Application Priority Data

Aug. 24, 2023 (CN) ........................ 202311074998.5

(51) Int. Cl.
*G09G 3/3233* (2016.01)

(52) U.S. Cl.
CPC ... *G09G 3/3233* (2013.01); *G09G 2300/0842* (2013.01); *G09G 2300/0861* (2013.01); *G09G 2310/0286* (2013.01); *G09G 2310/08* (2013.01); *G09G 2330/021* (2013.01)

(58) Field of Classification Search
None
See application file for complete search history.

(56) References Cited

U.S. PATENT DOCUMENTS

2005/0068284 A1* 3/2005 Joo ...................... G09G 3/3677 345/99
2007/0052656 A1* 3/2007 Park ..................... G09G 3/3677 345/100
2018/0197482 A1* 7/2018 Choi .................... G09G 3/3266
2018/0261163 A1* 9/2018 Hyun ..................... G09G 3/003
2018/0322831 A1* 11/2018 Kim ..................... G09G 3/3266
2021/0366397 A1* 11/2021 Na ....................... G09G 3/3291
2021/0407351 A1* 12/2021 Huang ................... G11C 19/28
2022/0020303 A1* 1/2022 Kwon .................. G09G 3/3275
2022/0036849 A1* 2/2022 Cheng ............... G02F 1/136286
2022/0392397 A1* 12/2022 Seo .......................... G09G 3/22
2023/0098040 A1* 3/2023 Zhou .................... G09G 3/3233 345/55
2023/0316976 A1* 10/2023 Zhou ........................ G09G 3/20 345/212

* cited by examiner

*Primary Examiner* — Dorothy Harris
(74) *Attorney, Agent, or Firm* — KDW Firm PLLC

(57) ABSTRACT

Provided are a display panel and a display device. The display panel includes a first driver circuit and a pixel circuit. The first driver circuit is configured to provide a first drive signal for the pixel circuit, where the first drive signal includes a first sub-drive signal and a second sub-drive signal. The first driver circuit includes a first driving portion and a second driving portion. The first driving portion includes the K-th stage to the L-th stage of shift registers and is configured to output the first sub-drive signal, and the second driving portion includes the M-th stage to the N-th stage of shift registers and is configured to output the second sub-drive signal. The pulse change frequency of the first sub-drive signal is F1, and the pulse change frequency of the second sub-drive signal is F2, where F1≠F2.

19 Claims, 16 Drawing Sheets

DISPLAY PANEL AND DISPLAY DEVICE

CROSS-REFERENCE TO RELATED APPLICATION(S)

This application claims priority to Chinese Patent Application No. 202311074998.5 filed Aug. 24, 2023, the disclosure of which is incorporated herein by reference in its entirety.

TECHNICAL FIELD

Embodiments of the present disclosure relate to the field of display technologies and, in particular, to a display panel and a display device.

BACKGROUND

With the development of display technologies, more and more electronic devices with the display function are widely applied to people's daily life and work, bringing great convenience to people's daily life and work.

In display devices such as a mobile phone, especially a foldable mobile phone, different displayed contents are presented in different regions at the same time due to the increased dimension. However, the current drive frequency of the mobile phone is consistent across the entire screen. As a result, it is impossible to set matching drive frequencies for different regions, resulting in the inability to locally improve the display performance, or it is impossible to reduce the local drive frequency while ensuring the display effect of the regions to achieve the purpose of saving power consumption.

SUMMARY

The present disclosure provides a display panel and a display device to achieve frequency control in a local region, thereby achieving the purpose of reducing display power consumption while satisfying the display performance requirements of display regions and displayed contents.

In a first aspect, embodiments of the present disclosure provide a display panel. The display panel includes a first driver circuit and a pixel circuit.

The first driver circuit is configured to provide a first drive signal for the pixel circuit, where the first drive signal includes a first sub-drive signal and a second sub-drive signal.

The first driver circuit includes a first driving portion and a second driving portion.

The first driving portion includes the K-th stage to the L-th stage of shift registers and is configured to output the first sub-drive signal, and the second driving portion includes the M-th stage to the N-th stage of shift registers and is configured to output the second sub-drive signal, where $K \geq 1$, $L \geq 1$, $M \geq 1$, and $N \geq 1$.

The pulse change frequency of the first sub-drive signal is F1, and the pulse change frequency of the second sub-drive signal is F2.

$F1 \neq F2$.

In a second aspect, the embodiments of the present disclosure further provide a display device. The display device includes the display panel described in the first aspect.

DETAILED DESCRIPTION

Figure 1:
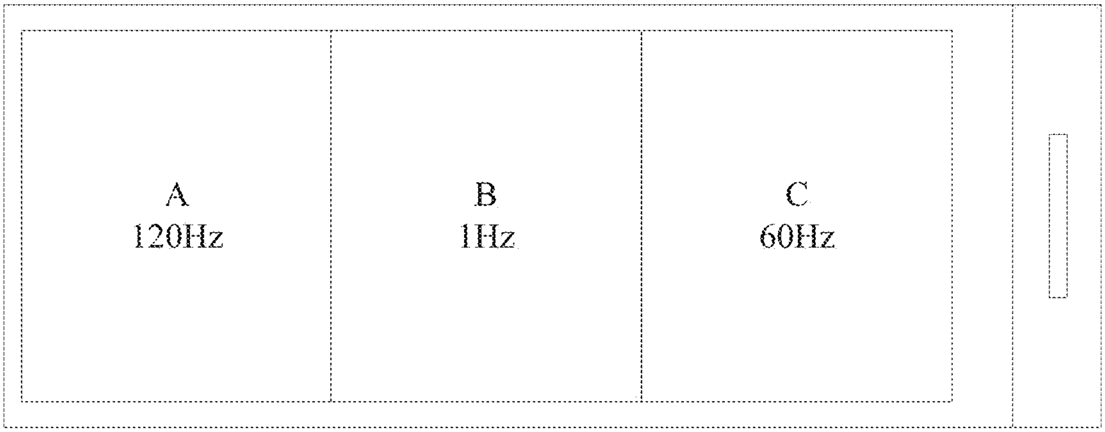
FIG. 1 (Prior Art)
FIG. 1 is a structural diagram of a foldable mobile phone in the related art.

Hereinafter the present disclosure is further described in detail in conjunction with the drawings and embodiments. It is to be understood that the embodiments described herein are intended to illustrate and not to limit the present disclosure. Additionally, it is to be noted that for ease of description, only part, not all, of structures related to the present disclosure are illustrated in the drawings.

Terms used in the embodiments of the present disclosure are intended only to describe the specific embodiments and not to limit the present disclosure. It is to be noted that nouns of locality, including "up", "down", "left", and "right" used in the embodiments of the present disclosure, are described from the perspective of the drawings and are not to be construed as a limitation to the embodiments of the present disclosure. In addition, in the context, it is to be understood that when a component is formed "on" or "below" another component, the component may not only be directly formed "on" or "below" another component, and may also be indirectly formed "on" or "below" another component via an intermediate component. Terms such as "first" and "second" are used only for the purpose of description to distinguish between different components and not to indicate any order, quantity, or importance. For those of ordinary skill in the art, specific meanings of the preceding terms in the present disclosure may be understood based on specific situations.

The terms "comprise", "include", and variations thereof in the present disclosure are intended to be inclusive, that is, "including, but not limited to". The term "based on" is "at least partially based on". The term "an embodiment" refers to "at least one embodiment".

It is to be noted that references to "first", "second", and the like in the present disclosure are merely intended to distinguish corresponding content and are not intended to limit an order or an interrelationship.

It is to be noted that "one" and "a plurality" mentioned in the present disclosure are illustrative and not limiting, and that those skilled in the art should understand that "one" and "a plurality" should be understood as "one or more" unless clearly indicated in the context.

FIG. 1 is a structural diagram of a foldable mobile phone in the related art. Referring to FIG. 1, due to the large dimension, the current foldable mobile phone generally has a partitioned display function, that is, different contents are displayed in different regions. For example, a game screen A, a chat screen B, and a movie screen C may be displayed separately. Since different regions have different displayed contents, different regions have different display performance requirements. For games and other displayed contents that are mostly complex and dynamic, the display performance requirements are higher and a higher refresh frequency is required to ensure the continuity of the picture and provide a better picture experience; while for social software and other displayed contents that are mostly static, the display performance requirements are lower, and a lower refresh frequency may be used to reduce display power consumption; and for general entertainment pictures such as movies, the required display performance and the required refresh frequency are medium. In the example shown in the figure, the required refresh frequency of the game screen A may be 120 Hz, the required refresh frequency of the chat software screen B may be 1 Hz, and the required refresh frequency of the movie screen C may be 60 Hz so that the refresh frequency requirements of different displayed contents can be matched, the best drive frequency can be provided, and at the same time, the purpose of saving the display power consumption can be achieved.

Figure 2:
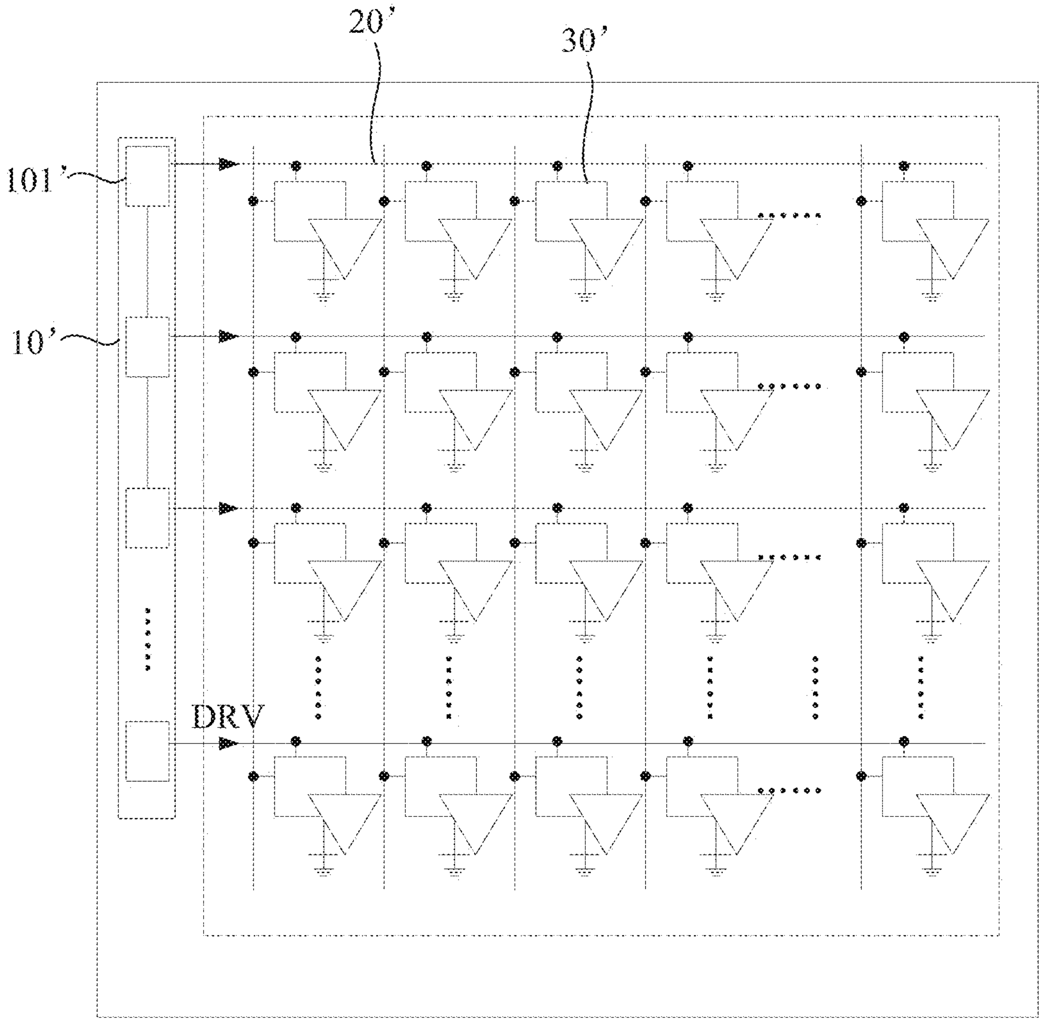
FIG. 2 (Prior Art)
FIG. 2 is a schematic diagram of a drive structure of a display device in the related art.

FIG. 2 is a schematic diagram of a drive structure of a display device in the related art. Referring to FIG. 2, however, in the existing display devices such as a mobile phone, a scan driving circuit 10' in a display panel generally outputs a drive signal DRV, and the drive signal DRV is transmitted to a pixel circuit 30' in a pixel array by using a signal line such as a gate line 20', so as to control the pixel array to display the image. The existing scan driving circuit 10' is generally formed by cascaded shift registers 101'. The process of sequentially outputting the drive signals DRV to the gate lines 20' by stages of shift registers 101' is triggered by the cascade. As a result, drive frequencies cannot be set separately for different regions in the display panel, and frequency control in a local region cannot be achieved. That is, the following cannot be achieved: the refresh frequency requirements of different displayed contents are matched, the best drive frequency is provided, and at the same time, the purpose of saving the display power consumption is achieved.

In view of the preceding technical problem, an embodiment of the present disclosure provides a display panel. The display panel includes a first driver circuit and a pixel circuit. The first driver circuit is configured to provide a first drive signal for the pixel circuit. The first drive signal includes a first sub-drive signal and a second sub-drive signal.

The first driver circuit includes a first driving portion and a second driving portion.

The first driving portion includes the K-th stage to the L-th stage of shift registers and is configured to output the first sub-drive signal, and the second driving portion includes the M-th stage to the N-th stage of shift registers and is configured to output the second sub-drive signal, where $K \geq 1$, $L \geq 1$, $M \geq 1$, and $N \geq 1$.

The pulse change frequency of the first sub-drive signal is F1, and the pulse change frequency of the second sub-drive signal is F2.

$F1 \neq F2$.

In the preceding technical solution, the first driver circuit provides the first drive signal for the pixel circuit, so as to drive the pixel circuit to work, thereby displaying the image. The first driver circuit is divided into two driving portions, that is, the first driving portion and a second driving portion. The first driving portion includes the K-th stage to the L-th stage of shift registers and is configured to output the first sub-drive signal to the corresponding pixel circuit. The second driving portion includes the M-th stage to the N-th stage of shift registers and is configured to output the second sub-drive signal to the corresponding pixel circuit. The first driving portion and the second driving portion can provide the first sub-drive signal and the second sub-drive signal with different pulse change frequencies. In this manner, it can be ensured that the corresponding pixel circuit driven by the first driving portion and the corresponding pixel circuit driven by the second driving portion have different working frequencies so that the problem that drive frequencies cannot be set separately for different regions in the existing display panel is solved, and corresponding matched drive frequencies can be provided for different regions and displayed contents, so as to achieve frequency control in a local region, thereby achieving the purpose of reducing display power consumption while satisfying the display performance requirements of display regions and displayed contents.

The preceding is the core idea of the present disclosure. The technical solutions in embodiments of the present disclosure are described clearly and completely hereinafter in conjunction with the drawings in the embodiments of the present disclosure. Based on the embodiments of the present disclosure, all other embodiments obtained by those of ordinary skill in the art on the premise that no creative work is done are within the scope of the present disclosure.

Figure 3:
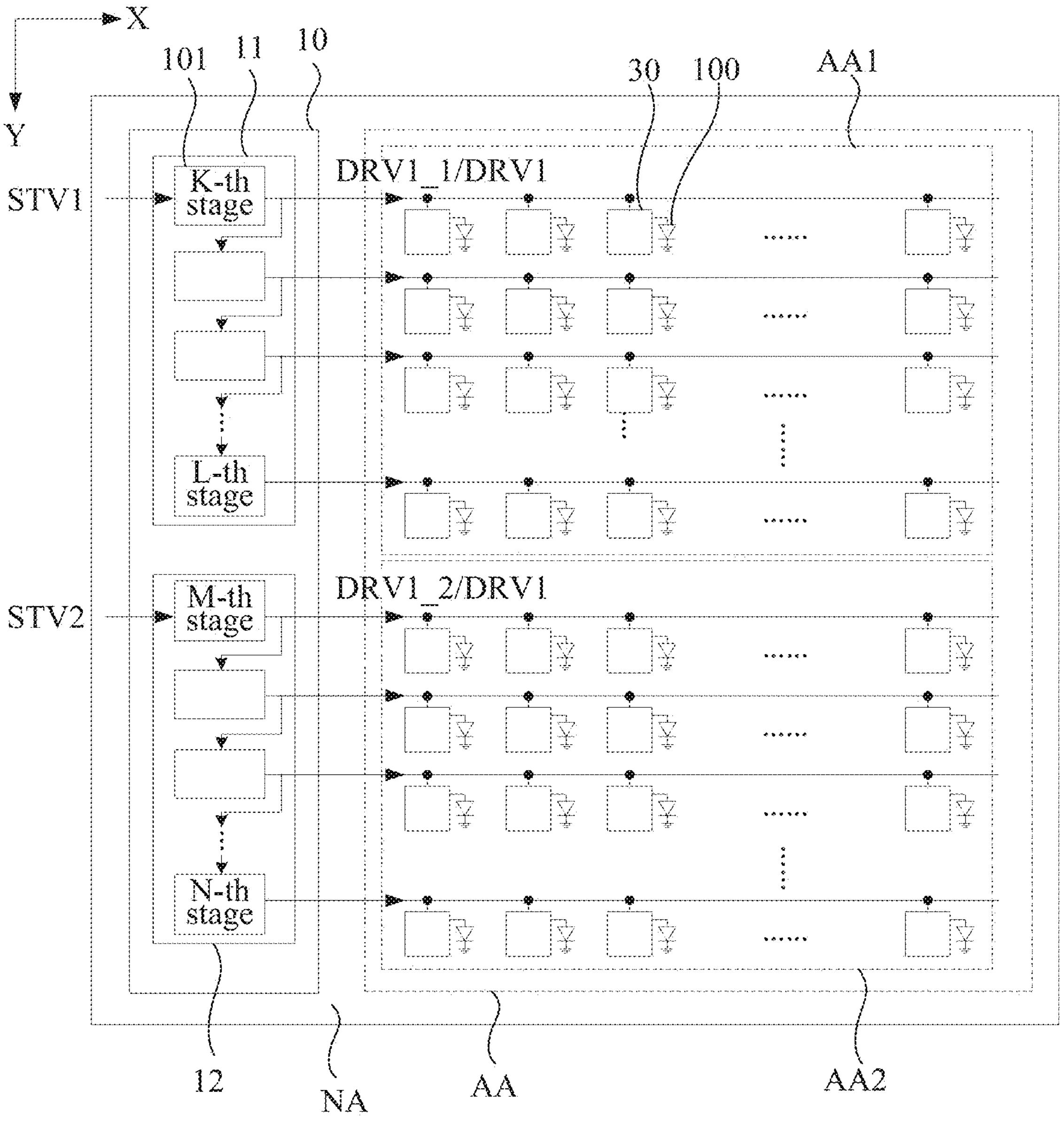
FIG. 3 is a structural diagram of a display panel according to an embodiment of the present disclosure.

FIG. 3 is a structural diagram of a display panel according to an embodiment of the present disclosure. Referring to FIG. 3, the display panel includes a first driver circuit 10 and a pixel circuit 30. The first driver circuit 10 is configured to provide a first drive signal DRV1 for the pixel circuit 30. The first drive signal DRV1 includes a first sub-drive signal DRV1_1 and a second sub-drive signal DRV1_2.

The first driver circuit 10 includes a first driving portion 11 and a second driving portion 12.

The first driving portion 11 includes the K-th stage to the L-th stage of shift registers 101 and is configured to output the first sub-drive signal DRV1_1, and the second driving portion 12 includes the M-th stage to the N-th stage of shift registers 101 and is configured to output the second sub-drive signal DRV1_2, where $K \geq 1$, $L \geq 1$, $M \geq 1$, and $N \geq 1$.

The pulse change frequency of the first sub-drive signal DRV1_1 is F1, and the pulse change frequency of the second sub-drive signal DRV1_2 is F2.

$F1 \neq F2$.

First, as shown in FIG. 3, the display panel in the embodiment of the present disclosure may include a display region AA and a non-display region NA. The pixel circuit 30 is located in the display region AA and is configured to drive a light-emitting element 100 provided in the display region AA to emit light. The light-emitting element 100 may specifically be an organic light-emitting diode (OLED) shown in FIG. 3 or may be an inorganic micro light-emitting diode (micro-LED) or an inorganic nano light-emitting diode (nano-LED). The light-emitting elements 100 are arranged in an array in the display region AA. Correspondingly, the pixel circuits 30 are also arranged in an array in the display region AA. That is, the display region AA includes multiple rows and columns of pixel circuits 30.

Figure 4:
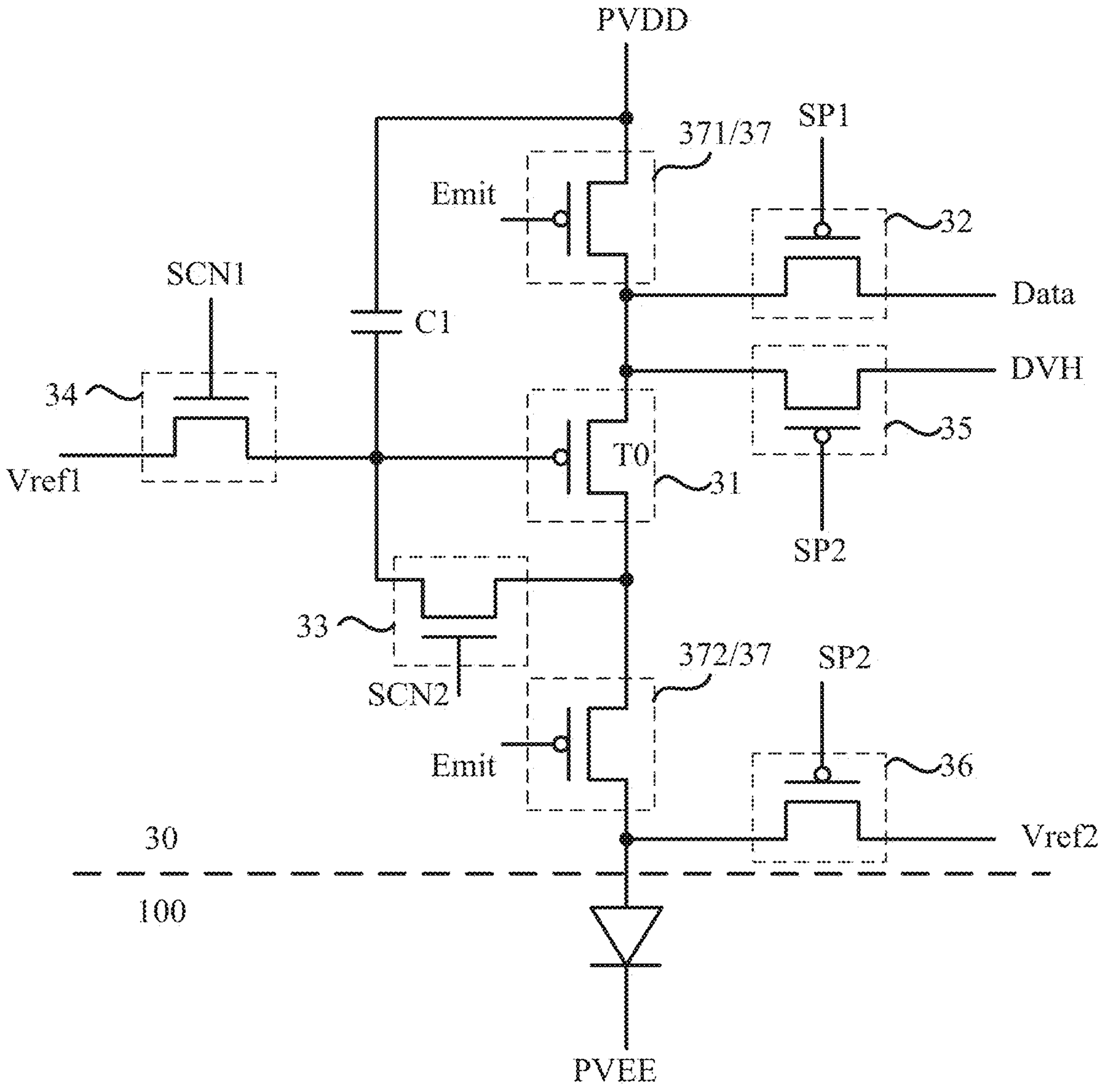
FIG. 4 is a structural diagram of a pixel circuit in a display panel according to an embodiment of the present disclosure.
Figure 5:
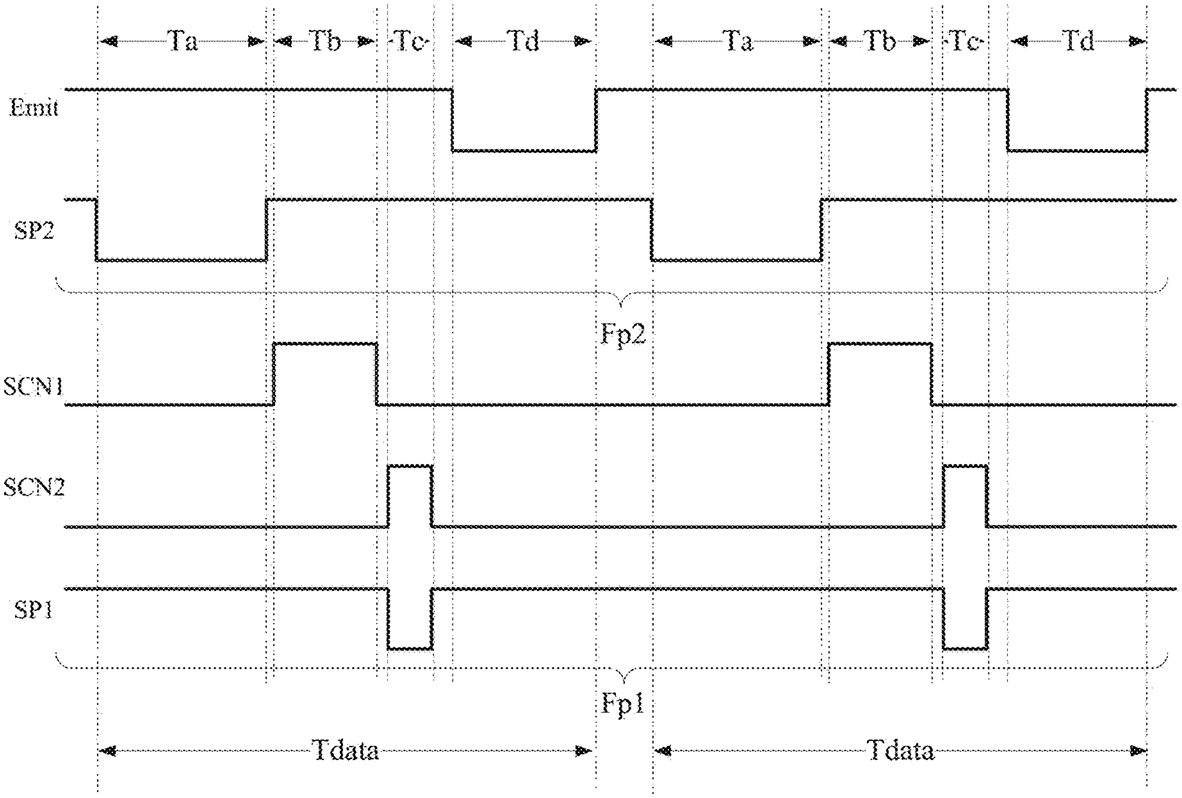
FIG. 5 is a drive timing diagram of the pixel circuit shown in FIG. 4.

In the embodiment of the present disclosure, the first driver circuit 10 is responsible for providing the first drive signal DRV1 to each row of pixel circuits 30 so that the pixel circuits 30 can work normally. Specifically, the first driver circuit 10 may be disposed in the non-display region NA and may be disposed on one side or two sides of the display region AA in a row direction X. FIG. 4 is a structural diagram of a pixel circuit in a display panel according to an embodiment of the present disclosure. FIG. 5 is a drive timing diagram of the pixel circuit shown in FIG. 4. Referring to FIGS. 4 and 5, for example, in the embodiment of the present disclosure, the pixel circuit 30 may include a drive module 31, a data write module 32, a compensation module 33, a reset module 34, a bias adjustment module 35, an initialization module 36, and a light emission control module 37. The drive module 31 includes a drive transistor T0. The data write module 32 is connected to a first electrode of the drive transistor T0 and is configured to provide a data signal data for the drive transistor T0. The compensation module 33 is connected between a gate and a second electrode of the drive transistor T0. The reset module 34 is connected to the gate or the second electrode of the drive transistor T0 and is configured to provide a reset signal Vref1 for the drive transistor T0. The bias adjustment module 35 is connected to the first electrode or the second electrode of the drive transistor T0 and is configured to provide a bias adjustment signal DVH for the drive transistor T0. The drive module 31 includes the drive transistor T0. The initialization module 36 is connected to the light-emitting element 100 and is configured to provide an initialization signal Vref2 for the light-emitting element 100. The light emission control module 37 is connected between a first power signal terminal PVDD and the drive transistor T0, or the light emission control module 37 is connected between the drive transistor T0 and the light-emitting element 100 and is configured to selectively allow the light-emitting element 100 to enter a light emission stage. In addition, the pixel circuit further includes a storage module 38. The storage module 38 is separately connected to the gate and the first electrode of the drive transistor T0 and is configured to store the data signal data.

The light emission control module 37 includes two light emission control sub-modules, that is, a first light emission control sub-module 371 and a second light emission control sub-module 372. For example, each of the drive module 31, the data write module 32, the compensation module 33, the reset module 34, the bias adjustment module 35, the initialization module 36, the first light emission control sub-module 371, and the second light emission control sub-module 372 includes a transistor, and the type of the transistor is an N-type channel transistor or a P-type channel transistor shown in FIG. 4. For example, the storage module 38 includes a storage capacitor C1. Based on this, the normal working process of the pixel circuit is briefly introduced below.

In a bias stage (initialization stage) Ta, a bias adjustment control signal SP2 received by a control terminal of the bias adjustment module 35 is in a valid pulse stage (low level), the bias adjustment module 35 is turned on, and the bias adjustment signal DVH is written into the first electrode of the drive transistor T0, so as to bias the gate-source voltage of the drive transistor T0. At this time, relative to the conduction state in the light emission stage, the drive transistor T0 can achieve reverse conduction, that is, reverse bias so that the drive transistor T0 can be prevented from being in a fixed bias state for a long time, thereby weakening the threshold voltage drift of the drive transistor T0 and ensuring the normal light emission in subsequent light emission stages. It should be added that an initialization control signal SP2 received by a control terminal of the initialization module 36 is also in the valid pulse stage (low level). In this stage, the initialization module 36 is synchronously turned on, and an anode of the light-emitting element 100 is initialized.

In a reset stage Tb, a first scan signal SCN1 received by a control terminal of the reset module 34 is in the valid pulse stage (high level), the reset module 34 is turned on, and the reset signal Vref1 is written into the gate of the drive transistor T0, so as to reset the gate.

In a data write stage TC, a data write control signal SP1 received by a control terminal of the data write module 32 is in the valid pulse stage (low level), a second scan signal SCN2 received by a control terminal of the compensation module 33 is in the valid pulse stage (high level), the data signal data is written into the gate of the drive transistor T0 through the data write module 32, the drive transistor T0, and the compensation module 33, and the data signal data compensated by the compensation module 33, that is, Vdata-Vth, is stored in the storage capacitor C1.

In a light emission stage Td, light emission control signals Emit received by the control terminals of the first light emission control sub-module 371 and the second light emission control sub-module 372 are in the valid pulse stage (low level), the first light emission control sub-module 371 and the second light emission control sub-module 372 are all turned on, the current provided by the first power signal terminal PVDD flows into the light-emitting element 100 through the first light emission control sub-module 371, the drive transistor T0, and the second light emission control sub-module 372 in sequence, and the data signal Vdata-Vth stored in the storage capacitor C1 in the data write stage TC controls the current in the conduction path, that is, controls the brightness of the light-emitting element 100.

It is to be noted here that the case where the bias adjustment stage TA is located before the reset stage TB shown in FIG. 5 is just an example. In actual application, the bias adjustment stage TA should be set in a stage in a refresh cycle other than the reset stage TB, the data write stage TC, and the light emission stage TD, so the bias adjustment stage TA may be located before the reset stage TB, located after the data write stage TC and before the light emission stage TD, or located after the light emission stage TD.

Based on the preceding pixel circuit, the first driver circuit 10 in the embodiment of the present disclosure can provide the first drive signal DRV1 for some modules in the pixel circuit 30. For example, the first driver circuit 10 may provide the first scan signal SCN1 for the reset module 34, that is, the first drive signal DRV1 is actually the first scan signal SCN1; or the first driver circuit 10 may provide the second scan signal SCN2 for the compensation module 33, that is, the first drive signal DRV1 is actually the second scan signal SCN2; or the first driver circuit 10 may provide the data write control signal SP1 for the data write module 32, that is, the first drive signal DRV1 is actually the data write control signal SP1. Therefore, the first driver circuit 10 can actually drive the pixel circuit 30 to implement a gate reset function, a data write function, and a threshold compensation function of the drive transistor T0.

In addition, the first driver circuit 10 in the embodiment of the present disclosure is provided with two drive structures, that is, the first driving portion 11 and the second driving portion 12. The first driving portion 11 includes the K-th stage to the L-th stage of shift registers 101, and the second driving portion 12 includes the M-th stage to the N-th stage of shift registers 101. Since each stage of the shift register 101 is actually responsible for providing the first drive signal DRV1 for the corresponding row of pixel circuits 30, the first driving portion 11 here may be understood as actually providing the first drive signals DRV1 for the pixel circuits 30 in the K-th row to the L-th row, and the second driving portion 12 may be understood as actually providing the first drive signals DRV1 for the pixel circuits 30 in the M-th row to the N-th row. The first drive signal DRV1 is divided into the first sub-drive signal DRV1_1 and the second sub-drive signal DRV1_2, where the first sub-drive signal DRV1_1 is the first drive signal DRV1 provided by the first driving portion 11, and the second sub-drive signal DRV1_2 is the first drive signal DRV1 provided by the second driving portion 12. It is to be understood that in the embodiment of the present disclosure, the first driver circuit 10 is configured to include two driving portions, that is, the first driving portion 11 and the second driving portion 12, and provides different first drive signals DRV1 for the pixel circuits 30 in different rows. In fact, the two driving portions independently drive the pixel circuits 30 in different rows, and the pulse change frequency F1 of the first sub-drive signal DRV1_1 is configured to be different from the pulse change frequency F2 of the second sub-drive signal DRV1_2, that is, the pulse change frequencies of the first drive signals DRV1 of the two driving portions are different. Therefore, the working frequencies of the corresponding rows of pixel circuits 30 can be adjusted by using the first drive signals DRV1 with different pulse change frequencies.

For example, the display region AA where the pixel circuits 30 in the K-th row to the L-th row are located is a first sub-display region AA1, and the display region AA where the pixel circuits 30 in the M-th row to the N-th row are located is a second sub-display region AA2. If the case where the first drive signal DRV1 is the data write control signal SP1 is used as an example, the pulse change frequency F1 of the first sub-drive signal DRV1_1 and the pulse change frequency F2 of the second sub-drive signal DRV1_2 are actually the data write frequency F1 of the first sub-display region AA1 and the data write frequency F2 of the second sub-display region AA2. Those skilled in the art know that the data write frequency represents the refresh frequency of the light-emitting element, that is, the screen refresh frequency. Therefore, the data write frequency of the pixel circuits 30 in the first sub-display region AA1 may be individually controlled by the first driving portion 11, and the data write frequency of the pixel circuits 30 in the second sub-display region AA2 may be individually controlled by the second driving portion 12 so that the screen refresh frequency of the first sub-display region AA1 and the screen refresh frequency of the second sub-display region AA2 can be controlled separately. In this manner, drive frequencies cannot be set separately for different regions in the display region AA, so as to achieve frequency control in a local region, thereby achieving the purpose of reducing display power consumption while satisfying the display performance requirements of display regions and displayed contents.

Further, it is to be noted that in the first driving portion 11 and the second driving portion 12, the pixel rows driven by the shift registers 101 may be completely in one-to-one correspondence with the shift registers 101 according to the arrangement number or may not be in one-to-one correspondence with the shift registers 101 according to the arrangement number. For example, in the first driving portion 11, the K-th stage to the L-th stage of shift registers 101 can drive the pixel circuits 30 in the K-th to the L-th row in one-to-one correspondence; and in the second driving portion 12, the M-th stage to the N-th stage of shift registers 101 can drive the pixel circuits 30 in the M-th row to the N-th row in one-to-one correspondence. At this time, the display region AA is actually divided into two sub-display regions according to the pixel row numbers, that is, the pixel circuits 30 in the K-th row to the L-th row are in one sub-display region, and the pixel circuits 30 in the M-th row to the N-th row are in one sub-display region so that drive frequencies can be set separately for different regions in the display panel. Of course, other connection manners may also be used according to actual panel requirements and are not limited to the preceding examples. For example, the K-th stage to the L-th stage of shift registers 101 can correspondingly drive the odd-numbered pixel rows, and the M-th stage to the N-th stage of shift registers 101 can correspondingly drive the even-numbered pixel rows.

In addition, it should be added that K, L, M, and N should at least satisfy the following conditions: L≥K, and N≥M. In the case where L=K and N=M, only one shift register 101 exists in each of the first driving portion 11 and the second driving portion 12. In the case where L≥K, it can be ensured that the K-th stage to the L-th stage of shift registers 101 can shift the trigger signal in sequence to achieve cascade triggering. In the case where N≥M, the M-th stage to the N-th stage of shift registers 101 can shift the trigger signal in sequence to achieve cascade triggering. In addition, those skilled in the art can design the specific circuit structure of the shift registers 101 according to actual requirements, and the embodiments of the present disclosure do not impose too many limitations.

With continued reference to FIG. 3, further, the K-th stage of shift register 101 receives a first trigger signal STV1, and the K-th stage to the L-th stage of shift registers 101 shift the first trigger signal STV1 and output the first sub-drive signals DRV1_1. The M-th stage of shift register receives a second trigger signal STV2, and the M-th stage to the N-th stage of shift registers 101 shift the second trigger signal STV2 and output the second sub-drive signals DRV1_2.

The shift registers 101 in the first driving portion 11 perform shifting in a cascade manner in sequence. The K-th stage of shift register 101 receives the first trigger signal STV1 to trigger the shift process. Each stage of shift register 101 outputs the first sub-drive signal DRV1_1, and the first sub-drive signal DRV1_1 outputted by the next stage of shift register 101 generates a fixed amount of shift in timing compared with the first sub-drive signal DRV1_1 outputted by the previous stage of shift register 101, so as to drive the corresponding pixel rows in sequence, that is, to achieve the scanning process row by row. Similarly, the shift registers 101 in the second driving portion 12 perform shifting in sequence, the second trigger signal STV2 received by the M-th stage of shift register 101 triggers the shift process, and a fixed amount of shift in timing is generated between the second sub-drive signals DRV1_2 outputted by the stages of shift registers 101, so as to drive the corresponding pixel rows in sequence, that is, to achieve the scanning process row by row.

Figure 6:
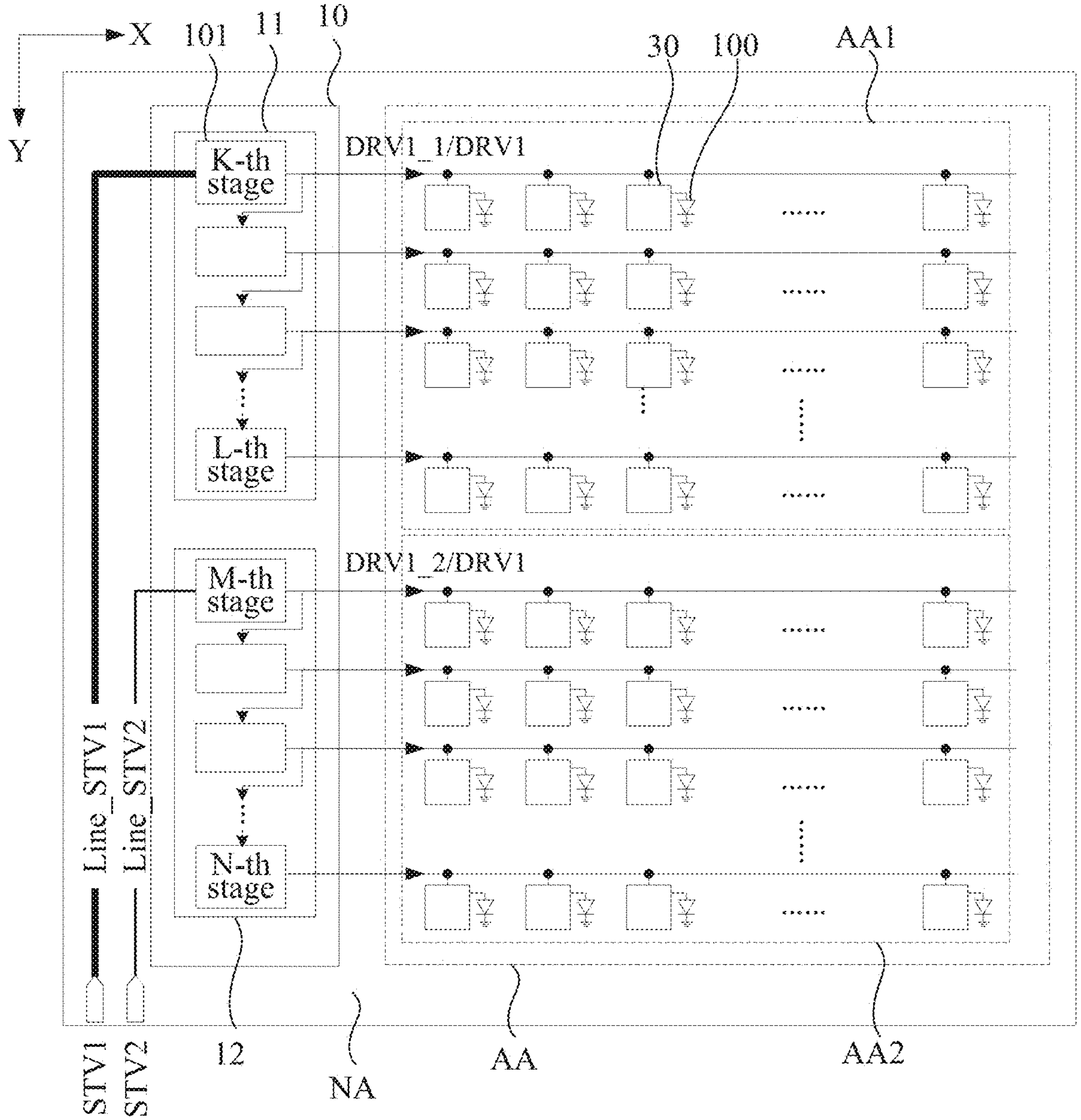
FIG. 6 is a structural diagram of another display panel according to an embodiment of the present disclosure.

FIG. 6 is a structural diagram of another display panel according to an embodiment of the present disclosure. Referring to FIG. 6, the display panel includes a first trigger signal line Line_STV1 and a second trigger signal line Line_STV2, where the first trigger signal line Line_STV1 is configured to provide the first trigger signal STV1 for the K-th stage of shift register 101, and the second trigger signal line Line_STV2 is configured to provide the second trigger signal STV2 for the M-th stage of shift register 101.

In this example, essentially, two trigger signal lines, that is, the first trigger signal line Line_STV1 and the second trigger signal line Line_STV2, are provided for the two driving portions, that is, the first driving portion 11 and the second driving portion 12, to provide the corresponding first trigger signal STV1 and the corresponding second trigger signal STV2 so that the first driving portion 11 and the second driving portion 12 can be independently controlled to separately provide the first drive signals DRV1 for the pixel circuits 30 in the K-th row to the L-th row and the pixel circuits 30 in the M-th row to the N-th row.

Generally speaking, a fan-out region (not shown in the figure) is disposed on one side of the display region AA in a column direction Y, for example, disposed in the non-display region NA on the lower side. In the fan-out region, an external device such as a driver chip is bonded. The external device provides trigger signals STV, and the trigger signals STV are separately provided for the first driving portion 11 and the second driving portion 12 through the first trigger signal line Line_STV1 and the second trigger signal line Line_STV2 disposed in the non-display region NA. The first driving portion 11 and the second driving portion 12 are disposed in the non-display region NA on one side of the display region AA in the row direction X, that is, disposed in the non-display region NA on the left side or right side, and the first driving portion 11 and the second driving portion 12 are arranged in the column direction Y. Therefore, when the first trigger signal line Line_STV1 and the second trigger signal line Line_STV2 are set, the extension lengths of the two trigger signal lines are different. With continued reference to FIG. 6, for example, in the case where the first driving portion 11 is located above the second driving portion 12, the length of the first trigger signal line Line_STV1 is greater than the length of the second trigger signal line Line_STV2. In addition, in the embodiment of the present disclosure, the width of the first trigger signal line Line_STV1 may be configured to be greater than the width of the second trigger signal line Line_STV2. Therefore, while the impedance of the first trigger signal line Line_STV1 increases due to the larger length, the impedance decreases due to the larger width. Finally, the impedance balance between the first trigger signal line Line_STV1 and the second trigger signal line Line_STV2 is achieved so that while the trigger signals are transmitted, the difference between the first drive signals DRV1 generated by the two driving portions due to the impedance difference does not occur, so as to ensure that the pixel circuits in the rows have the same working state and avoid the problem of uneven brightness of the light-emitting elements.

Of course, the preceding differentiated setting of the lengths and widths of the first trigger signal line Line_STV1 and the second trigger signal line Line_STV2 is not a limitation. According to the actual requirements and panel design, those skilled in the art can only set the two trigger signal lines to have different lengths, only set the two trigger signal lines to have different widths, or set the two trigger signal lines to have the same length and width.

Figure 7:
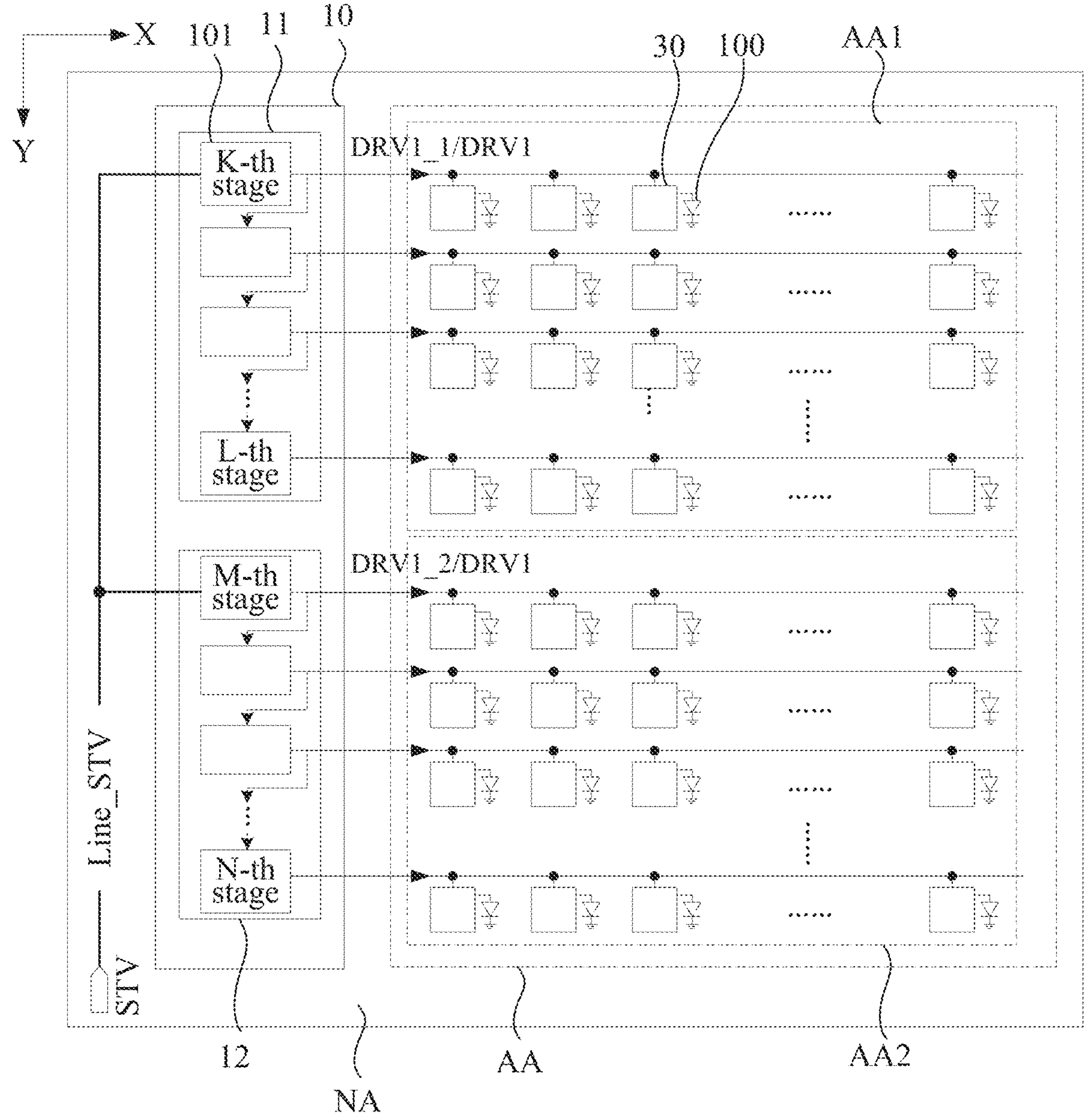
FIG. 7 is a structural diagram of another display panel according to an embodiment of the present disclosure.

FIG. 7 is a structural diagram of another display panel according to an embodiment of the present disclosure. Referring to FIG. 7, in another embodiment of the present disclosure, the display panel includes an initial trigger signal line Line_STV configured to provide the first trigger signal STV1 for the K-th stage of shift register 101 and provide the second trigger signal STV2 for the M-th stage of shift register 101.

The initial trigger signal line Line_STV here is actually connected to the first driving portion 11 and the second driving portion 12 at the same time. The initial trigger signal line Line_STV corresponds to the working time of the first driving portion 11 and the working time of the second driving portion 12 and is responsible for providing the first trigger signal STV1 and the second trigger signal STV2 in a time-sharing manner. In the working stage of the first driving portion 11, the first trigger signal STV1 is transmitted on the initial trigger signal line Line_STV, the first driving portion 11 works normally, and the second driving portion 12 may be set to an off state and cannot work normally even if the second driving portion 12 receives the first trigger signal STV1. Similarly, in the working stage of the second driving portion 12, the second trigger signal STV2 is transmitted on the initial trigger signal line Line_STV, the second driving portion 12 works normally, and since the first driving portion 11 is in the off state, the first driving portion 11 cannot work normally even if the first driving portion 11 receives the second trigger signal STV2.

Of course, in other embodiments of the present disclosure, a selector or a selector switch may further be disposed on the initial trigger signal line Line_STV and is responsible for connecting the initial trigger signal line Line_STV to the first driving portion 11 or the second driving portion 12 so that the initial trigger signal line Line_STV separately provides the two trigger signals STV for the first driving portion 11 and the second driving portion 12 in a time-sharing manner. The selector or the selector switch can control gating through corresponding timing signals. In the embodiments of the present disclosure, the selector or the selector switch and timing control signals can be set according to actual requirements, without excessive limitations here.

Figure 8:
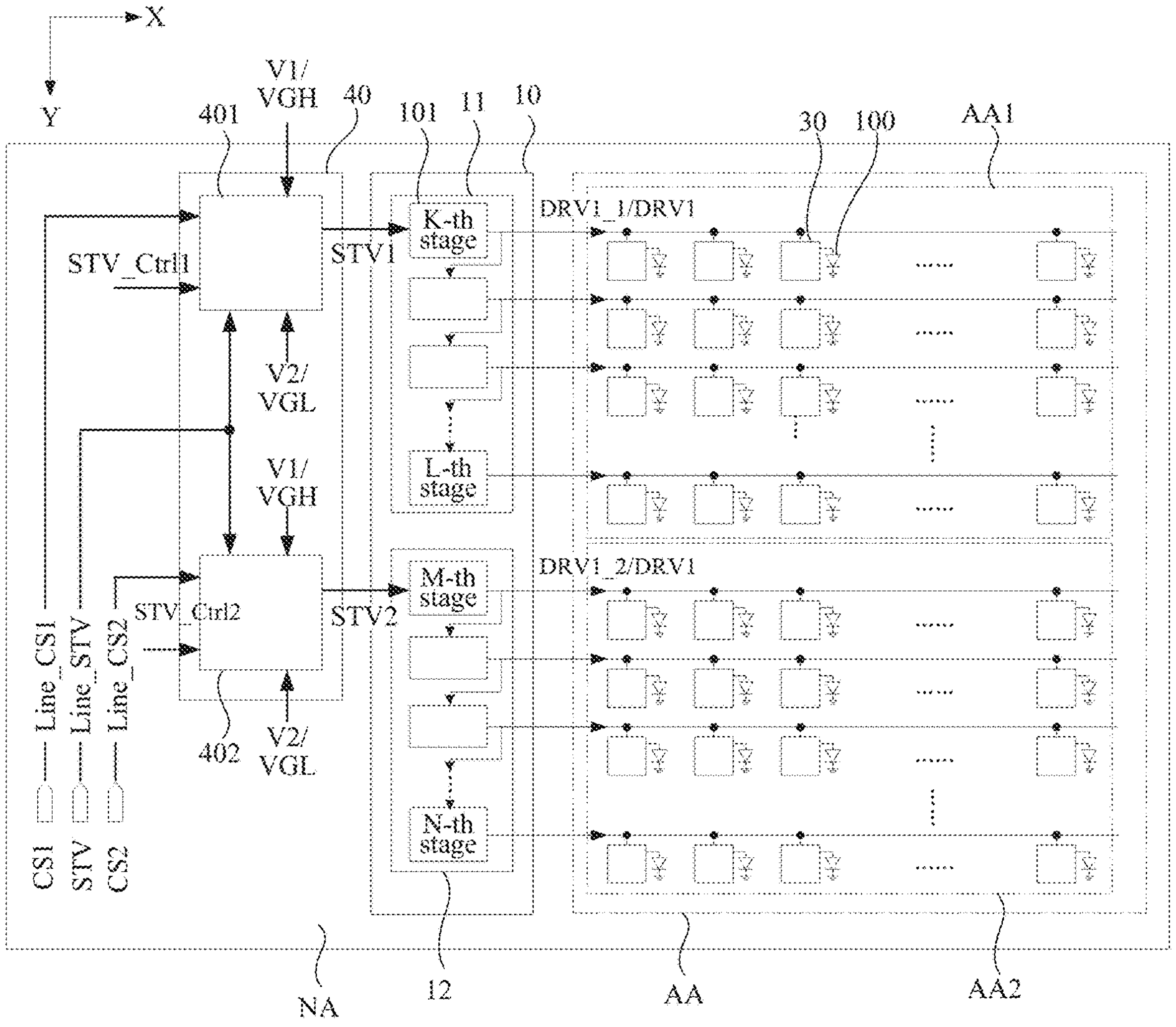
FIG. 8 is a structural diagram of another display panel according to an embodiment of the present disclosure.

FIG. 8 is a structural diagram of another display panel according to an embodiment of the present disclosure. Referring to FIG. 8, in other embodiments of the present disclosure, the display panel may include a control unit 40 receiving at least the initial trigger signal STV, where the control unit 40 includes a first control unit 401 and a second control unit 402. The first control unit 401 is configured to receive at least the initial trigger signal STV and output the first trigger signal STV1, and an output terminal of the first control unit 401 is connected to the K-th stage of shift register 101 and is configured to provide the first trigger signal STV1 for the K-th stage of shift register 101; and/or the second control unit 402 is configured to receive at least the initial trigger signal STV and output the second trigger signal STV2, and an output terminal of the second control unit 402 is connected to the M-th stage of shift register 101 and is configured to provide the second trigger signal STV2 for the M-th stage of shift register 101.

In the preceding embodiment, the solution of using the trigger signal lines to provide the trigger signals for the first driving portion 11 and the second driving portion 12 is essentially to provide two trigger signals for the two trigger signal lines directly through the external device such as the driver chip. Compared with the preceding embodiment, in this embodiment, essentially, the control unit 40 converts the initial trigger signal STV into the first trigger signal STV1 and the second trigger signal STV2 and provides the first trigger signal STV1 and the second trigger signal STV2 for the first driving portion 11 and the second driving portion 12, respectively. Specifically, the control unit 40 is divided into the first control unit 401 and the second control unit 402. The two control units 40 are the same in that each of the two control units 40 generates and outputs the trigger signal according to the initial trigger signal STV. In this case, the external device such as the driver chip only needs to provide one initial trigger signal STV to provide two corresponding trigger signals for the first driving portion 11 and the second driving portion 12, which is conducive to simplifying the structural design of the driver chip, so as to save the trigger signal lines and avoid the signal transmission difference when multiple trigger signal lines exist.

In addition, with continued reference to FIG. 8, the display panel includes the initial trigger signal line Line_STV configured to provide the initial trigger signal STV for the control unit 40. The initial trigger signal line Line_STV is separately connected to the first control unit 401 and the second control unit 402 and provides the initial trigger signal STV for the two control units synchronously.

It is to be noted that, in addition to receiving the synchronized initial trigger signals STV, the preceding first control unit 401 and the preceding second control unit 402 also receive other control signals to convert the initial trigger signals STV into the first trigger signal STV1 and the second trigger signal STV2, so as to provide the first trigger signal STV1 and the second trigger signal STV2 for the first driving portion 11 and the second driving portion 12, respectively. Other signals received by the first control unit 401 and the second control unit 402 are introduced below.

With continued reference to FIG. 8, specifically, the control unit 40 is configured to receive a first level signal V1 and a second level signal V2, receive the initial trigger signal STV and/or a frequency control signal CS and/or a trigger control signal STV_Ctrl, and output the first trigger signal STV1 or the second trigger signal STV2, where the voltage value of the first level signal V1 is greater than the voltage value of the second level signal V2. The frequency control signal CS received by the first control unit 401 is a first frequency control signal CS1, and/or the trigger control signal STV_Ctrl received by the first control unit 401 is a first trigger control signal STV_Ctrl1, and the first control unit 401 is configured to output the first trigger signal STV1. The frequency control signal CS received by the second control unit 402 is a second frequency control signal CS2, and/or the trigger control signal STV_Ctrl received by the second control unit 402 is a second trigger control signal STV_Ctrl2, and the second control unit 402 is configured to output the second trigger signal STV2. The pulse change frequency of the first frequency control signal CS1 is Fc1, and the pulse change frequency of the second frequency control signal CS2 is Fc2, where $Fc1 \neq Fc2$.

First, the voltage value of the first level signal V1 is greater than the voltage value of the second level signal V2, so it is to be understood that the first level signal V1 and the second level signal V2 are a high-level signal VGH and a low-level signal VGL, respectively. The control unit 40 receives the initial trigger signal STV and/or the frequency control signal CS and/or the trigger control signal STV_Ctrl and outputs the first trigger signal STV1 or the second trigger signal STV2. Essentially, the initial trigger signal STV and/or the frequency control signal CS and/or the trigger control signal STV_Ctrl are used as switch control signals to control the control unit 40 to output the high-level signal VGH or the low-level signal VGL, so as to control the pulse width, the pulse frequency, the cycle, the duty cycle, and other parameters of the outputted pulse signal, thereby forming the first trigger signal STV1 or the second trigger signal STV2.

Specifically, the first control unit 401 receives the initial trigger signal STV, the first frequency control signal CS1, and the first trigger control signal STV_Ctrl1 and outputs the first trigger signal STV1. Essentially, the initial trigger signal STV, the first frequency control signal CS1, and the first trigger control signal STV_Ctrl1 are used as the switch control signals to control the output of the high-level signal VGH or the low-level signal VGL, so as to control the pulse width, the pulse frequency, the cycle, the duty cycle, and other parameters of the outputted pulse signal, thereby generating and outputting the first trigger signal STV1. The same applies to the second control unit 402. The details are not repeated here.

Figure 9:
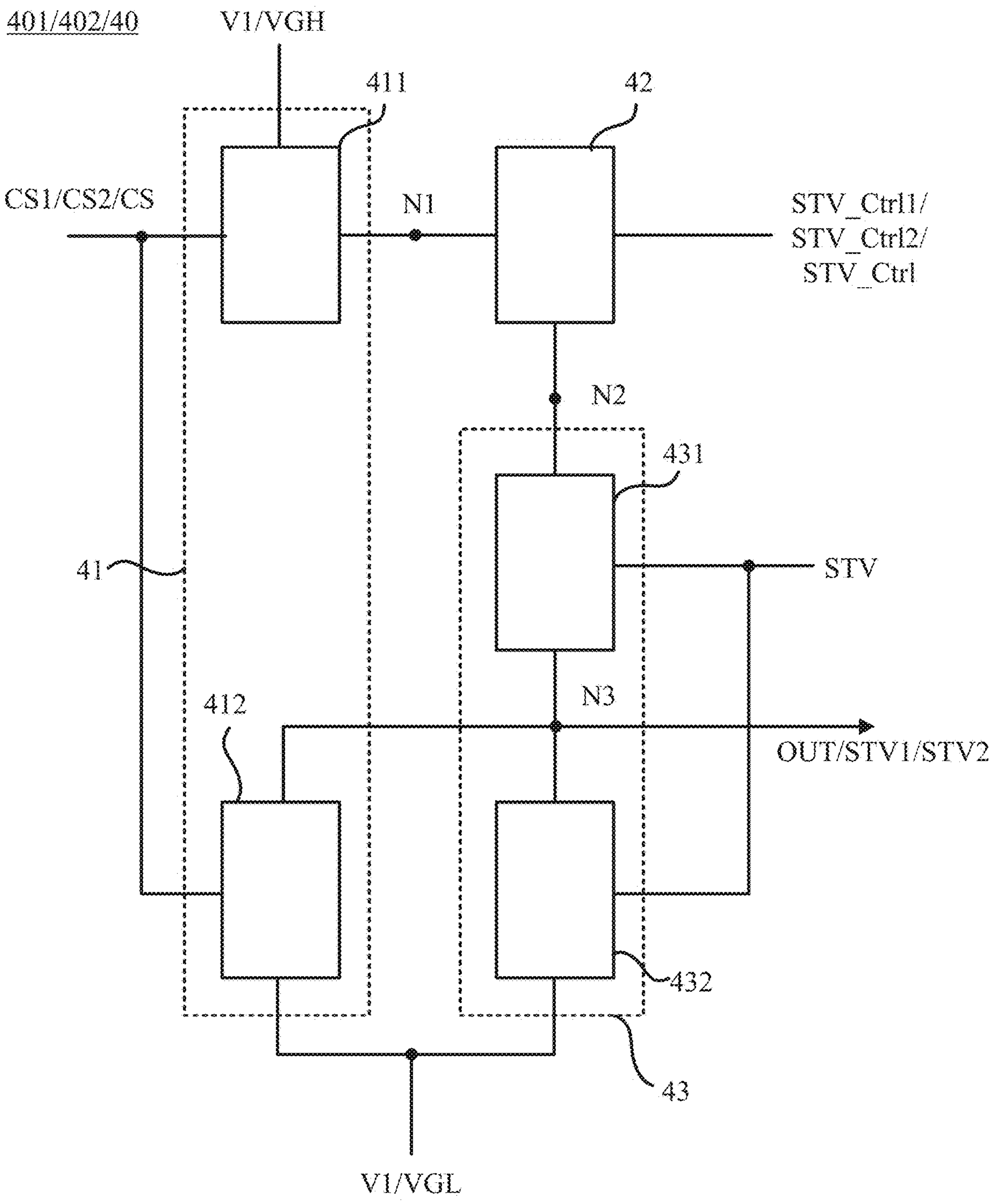
FIG. 9 is a structural diagram of a control unit shown in FIG. 8.

The specific structure and specific working process of the control unit are introduced below through embodiments. FIG. 9 is a structural diagram of a control unit shown in FIG. 8. Referring to FIGS. 8 and 9, the control unit 40 includes a first module 41 and/or a second module 42 and/or a third module 43. The frequency control signal CS is used for controlling the first module 41; and/or the trigger control signal STV_Ctrl is used for controlling the second module 42; and/or the initial trigger signal STV is used for controlling the third module 43.

More specifically, the first module 41 receives the first level signal V1 and the second level signal V2 and controls a signal of a first node N1 and a signal of a third node N3 in response to the frequency control signal CS; the second module 42 receives the signal of the first node N1 and controls a signal of a second node N2 in response to the trigger control signal STV_Ctrl; the third module 43 receives the signal of the second node N2 and the second level signal V2 and controls the signal of the third node N3 in response to the initial trigger signal STV; and the third node N3 is configured to output the first trigger signal STV1 or the second trigger signal STV2.

The third node N3 is essentially an output terminal of the control unit 40 and is located on a series circuit between the first level signal V1 and the second level signal V2. The series circuit is provided with a first partial structure 411 of the first module 41, the first node N1, the second module 42, the second node N2, a first partial structure 431 of the third module 43, a second partial structure 412 of the first module 41, and a second partial structure 432 of the third module 43, where the second partial structure 412 of the first module 41 and the second partial structure 432 of the third module 43 are in a parallel relationship. It can be seen from this circuit architecture that the first partial structure 411 of the first module 41, the second module 42, and the first partial structure 431 of the third module 43 are located between a first level signal terminal and the third node N3. At this time, in the case where the frequency control signal CS controls the first partial structure 411 of the first module 41 to be turned on, the trigger control signal STV_Ctrl controls the second module 42 to be turned on, and the initial trigger signal STV controls the first partial structure 431 of the third module 43 to be turned on, the first level signal V1 can be inputted to the third node N3, that is, the control unit 40 can output the first level signal V1. The second partial structure 412 of the first module 41 and the second partial structure 432 of the third module 43 are located between the third node N3 and a second level signal terminal. At this time, in the case where the frequency control signal CS controls the second partial structure 412 of the first module 41 to be turned on and the initial trigger signal STV controls the second partial structure 432 of the third module 43 to be turned on, the second level signal V2 can be inputted to the third node N3, that is, the control unit 40 can output the second level signal V2.

It is to be noted that in the preceding embodiment, the case where the control unit 40 includes the first module 41, the second module 42, and the third module 43 at the same time is only one embodiment of the present disclosure. Based on the principle of controlling whether each module is turned on or off to control the output of the high-level signal or the low-level signal, the circuit structure of the control unit 40 can be reasonably modified. For example, the solution of removing some modules among the first module 41, the second module 42, and the third module 43 falls within the scope of the present disclosure.

Figure 10:
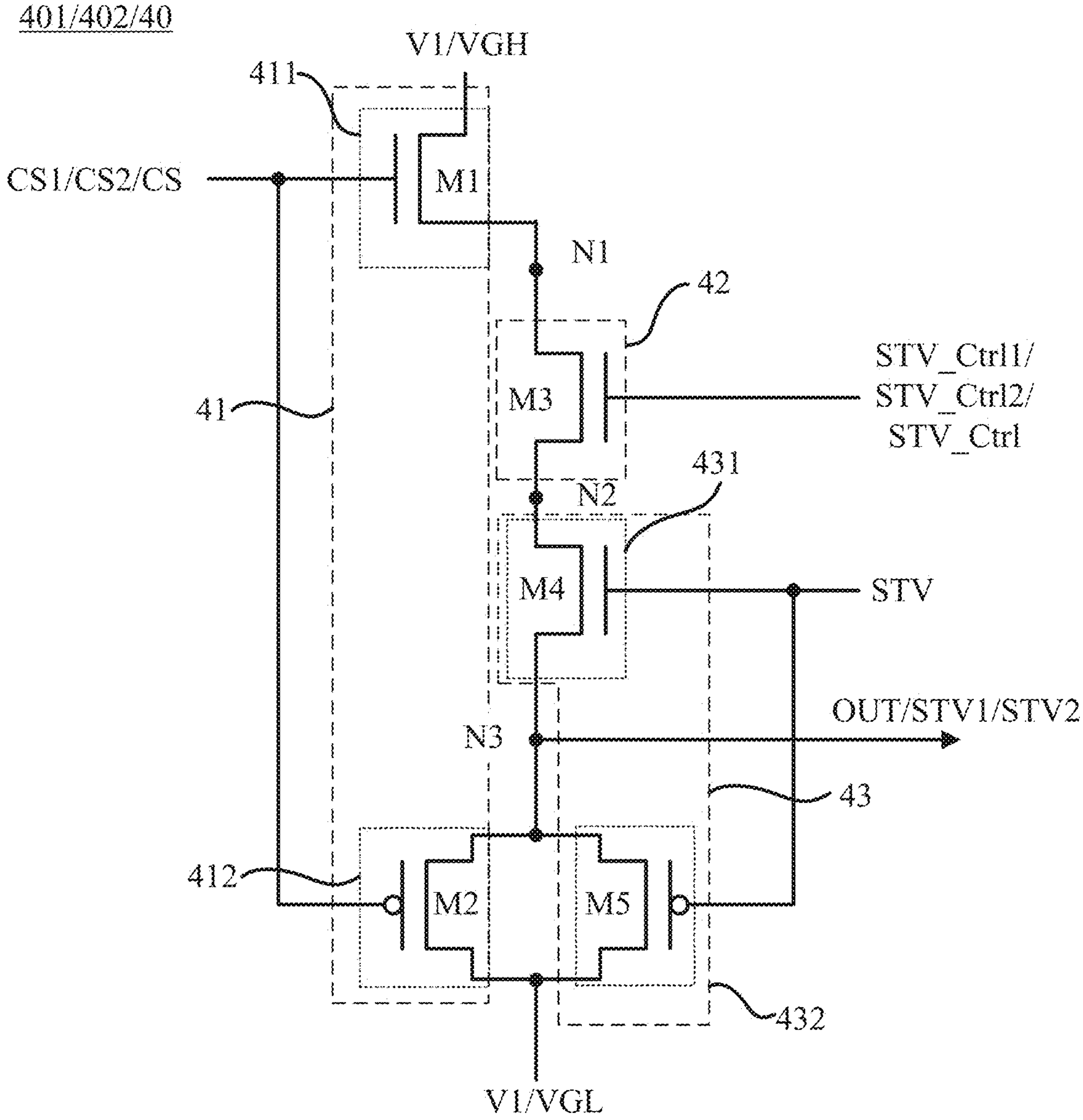
FIG. 10 is a schematic diagram of a circuit structure of the control unit shown in FIG. 9.

For the control unit shown in FIG. 9, the embodiment of the present disclosure further provides a specific circuit structure of the control unit. FIG. 10 is a schematic diagram of a circuit structure of the control unit shown in FIG. 9. Referring to FIG. 10, the specific structure of the control unit in the embodiment of the present disclosure is introduced below.

In an embodiment, the first module 41 includes a first transistor M1 and a second transistor M2. A first electrode of the first transistor M1 receives the first level signal V1, a second electrode of the first transistor M1 is connected to the first node N1, and a gate of the first transistor M1 receives the frequency control signal CS; and a first electrode of the second transistor M2 receives the second level signal V2, a second electrode of the second transistor M2 is connected to the third node N3, and a gate of the second transistor M2 receives the frequency control signal CS. The second module 42 includes a third transistor M3. A first electrode of the third transistor M3 is connected to the first node N1, a second electrode of the third transistor M3 is connected to the second node N2, and a gate of the third transistor M3 receives the trigger control signal STV_Ctrl. The third module 43 includes a fourth transistor M4 and a fifth transistor M5. A first electrode of the fourth transistor M4 is connected to the second node N2, a second electrode of the fourth transistor M4 is connected to the third node N3, and a gate of the fourth transistor M4 receives the initial trigger signal STV; and a first electrode of the fifth transistor M5 receives the second level signal V2, a second electrode of the fifth transistor M5 is connected to the third node N3, and a gate of the fifth transistor M5 receives the initial trigger signal STV.

Further, based on the preceding embodiment, in the case where the first transistor M1 is turned on, the second transistor M2 is turned off; or in the case where the first transistor M1 is turned off, the second transistor M2 is turned on. In the case where the fourth transistor M4 is turned on, the fifth transistor M5 is turned off; or in the case where the fourth transistor M4 is turned off, the fifth transistor M5 is turned on.

The first partial structure 411 of the first module 41 includes the first transistor M1, the second partial structure 412 includes the second transistor M2, the first transistor M1 is located between the first level signal terminal and the third node N3, the second transistor M2 is located between the second level signal terminal and the third node N3, the first transistor M1 is responsible for controlling the input of the first level signal V1 to the third node N3, and the second transistor M3 is responsible for controlling the input of the second level signal V2 to the third node N3. It can be seen from this that the two transistors need to be turned on in a time-sharing manner so that in the case where the first transistor M1 is turned on, the first level signal V1 is input to the third node N3, and in the case where the second transistor M2 is turned on, the second level signal V2 is input to the third node N3, thereby preventing the first level signal V1 and the second level signal V2 from being inputted to the third node N3 at the same time.

Similarly, the first partial structure 431 of the third module 43 includes the fourth transistor M4, the second partial structure 432 includes the fifth transistor M5, the fourth transistor M4 is located between the first level signal terminal and the third node N3, the fifth transistor M5 is located between the second level signal terminal and the third node N3, the fourth transistor M4 is responsible for controlling the input of the first level signal V1 to the third node N3, and the fifth transistor M5 is responsible for controlling the input of the second level signal V2 to the third node N3. It can be seen from this that the two transistors need to be turned on in a time-sharing manner so that in the case where the fourth transistor M4 is turned on, the first level signal V1 is input to the third node N3, and in the case where the fifth transistor M5 is turned on, the second level signal V2 is input to the third node N3, thereby preventing the first level signal V1 and the second level signal V2 from being inputted to the third node N3 at the same time.

In addition, considering that the gate of the first transistor M1 and the gate of the second transistor M2 receive the same control signal, that is, the frequency control signal CS, to ensure that the first transistor M1 and the second transistor M2 are turned on in a time-sharing manner, it should be ensured that under the control of the same level, one of the first transistor M1 or the second transistor M2 is turned on, and the other one of the first transistor M1 or the second transistor M2 is turned off. One of the first transistor M1 or the second transistor M2 may be configured to be a P-type channel transistor, and the other one of the first transistor M1 or the second transistor M2 may be configured to be an N-type channel transistor. Similarly, since the gate of the fourth transistor M4 and the gate of the fifth transistor M5 receive the same control signal, that is, the initial trigger signal STV, one of the fourth transistor M4 or the fifth transistor M5 may be configured to be a P-type channel transistor, and the other one of the fourth transistor M4 or the fifth transistor M5 may be configured to be an N-type channel transistor so that under the control of the same signal, one of the fourth transistor M4 or the fifth transistor M5 is turned on, and the other one of the fourth transistor M4 or the fifth transistor M5 is turned off.

For the other transistors in the preceding control unit, for example, the third transistor M3, those skilled in the art may choose the channel type of the third transistor M3 to be P-type or N-type. The case where the third transistor M3 in FIG. 10 is an N-type channel transistor is used as an example. In the case where the trigger control signal STV_Ctrl received by the gate of the third transistor M3 is a high-level signal, the third transistor M3 is turned on, and in the case where the trigger control signal STV_Ctrl received by the gate of the third transistor M3 is a low-level signal, the third transistor M3 is turned off.

Figure 11:
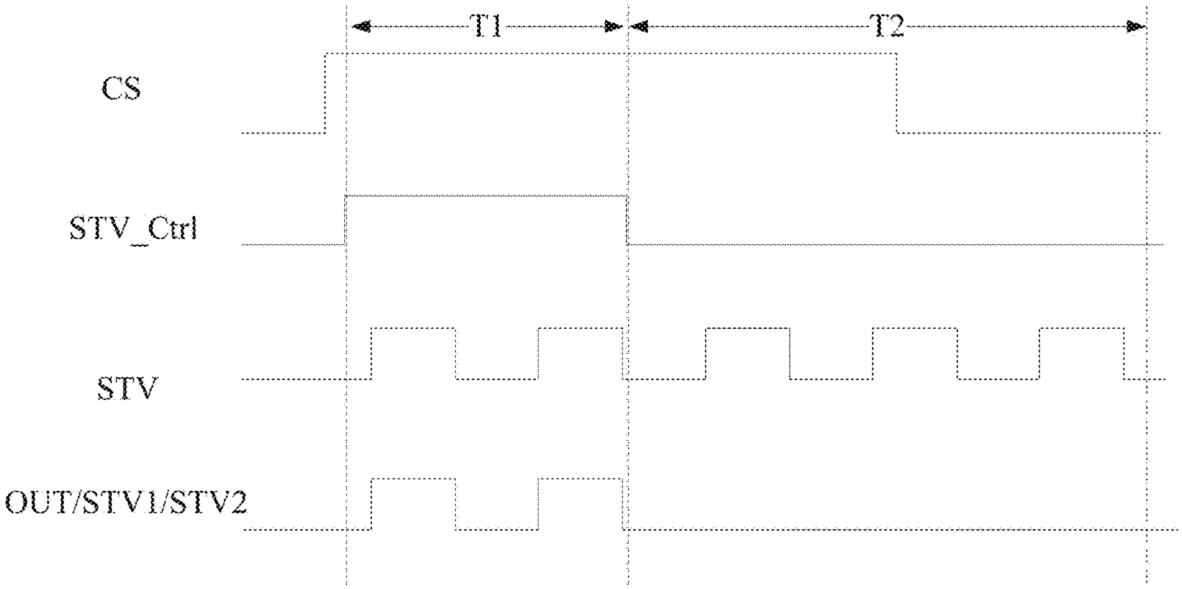
FIGS. 11 and 12 are two drive timing diagrams of the control unit shown in FIG. 10.
Figure 12:
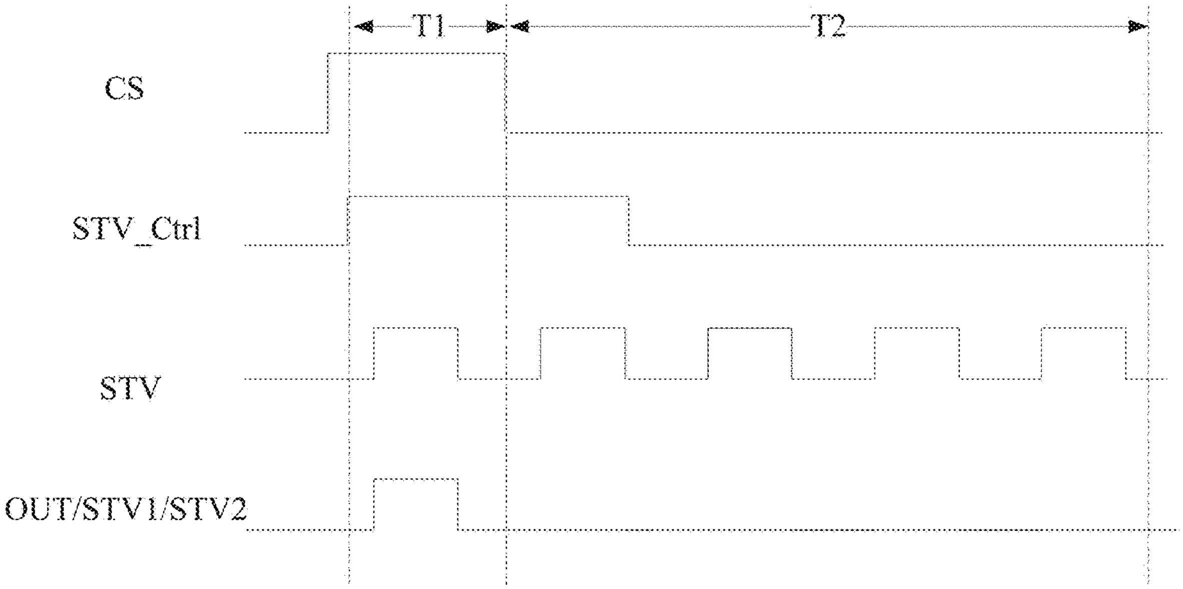

FIGS. 11 and 12 are two drive timing diagrams of the control unit shown in FIG. 10. The structure shown in FIG. 10 is used as an example. Referring to FIGS. 11 and 12, the control process of the control unit is introduced below.

First, the first transistor M1 and the fourth transistor M4 are N-type channel transistors, the second transistor M2 and the fifth transistor M5 are P-type channel transistors, and the third transistor M3 is an N-type channel transistor. According to the rough principle that the N-type channel transistor is turned on when the gate is at a high level and the P-type channel transistor is turned on when the gate is at a low level, in a first stage T1, in the case where the frequency control signal CS and the trigger control signal STV_Ctrl are both at a high level, the first transistor M1 and the third transistor M3 are turned on, and the second transistor M2 is turned off. At this time, in the case where the initial trigger signal STV is at a high level, the fourth transistor M4 is turned on, the fifth transistor M5 is turned off, and the first level signal V1 may be inputted to the third node N3 through the first transistor M1, the third transistor M3, and the fourth transistor M4. At this time, the control unit 40 outputs the high-level signal VGH. In the case where the initial trigger signal STV is at a low level, the fourth transistor M4 is turned off, the fifth transistor M5 is turned on, and the second level signal V2 may be input to the third node N3 through the fifth transistor M5. At this time, the control unit 40 outputs the low-level signal VGL.

In a second stage T2, in the case where the frequency control signal CS or the trigger control signal STV_Ctrl is at a low level, the first transistor M1 or the third transistor M3 is turned off, and the first level signal V1 cannot be inputted to the third node N3 through the first transistor M1, the third transistor M3, and the fourth transistor M4. At this time, the control unit 40 outputs the low-level signal VGL.

It is to be noted here that, the case where the high-level signal outputted by the third node N3 is an effective pulse is used as an example, in the case where the frequency control signal CS, the trigger control signal STV_Ctrl, and the initial trigger signal STV control the first transistor M1, the third transistor M3, and the fourth transistor M4 to be turned on, respectively and the first level signal V1, that is, the high-level signal VGH, is inputted to the third node N3, the frequency control signal CS, the trigger control signal STV_Ctrl, and the initial trigger signal STV are all in an effective pulse stage at this time. Since the first transistor M1 is an N-type channel transistor, an effective pulse in the frequency control signal CS for controlling the first transistor M1 to be turned on is essentially a high-level pulse. On the contrary, an ineffective pulse is a low-level pulse. Similarly, since the channel types of the third transistor M3 and the fourth transistor M4 are N-type, the effective pulses of the trigger control signal STV_Ctrl and the initial trigger signal STV are also high-level pulses. Of course, in other embodiments, in the case where the first transistor M1, the third transistor M3, and the fourth transistor M4 are P-type channel transistors, the effective pulses of the frequency control signal CS, the trigger control signal STV_Ctrl, and the initial trigger signal STV should be low-level pulses.

If the low-level signal outputted by the third node N3 is an effective pulse, in the case where the frequency control signal CS, the trigger control signal STV_Ctrl, and the initial trigger signal STV control the first transistor M1, the third transistor M3, and the fourth transistor M4 to be turned off, respectively, the second transistor M2 and the fifth transistor M5 are turned on, and the second level signal V2, that is, the low-level signal VGL, is inputted to the third node N3, the frequency control signal CS, the trigger control signal STV_Ctrl, and the initial trigger signal STV are all in the effective pulse stage at this time. If the case where the channel type of the first transistor M1, the third transistor M3, and the fourth transistor M4 are all N-type is used as an example, the effective pulses of the frequency control signal CS, the trigger control signal STV_Ctrl, and the initial trigger signal STV are essentially low-level signals. Of course, in other embodiments, in the case where the first transistor M1, the third transistor M3, and the fourth transistor M4 are P-type channel transistors, the effective pulses of the frequency control signal CS, the trigger control signal STV_Ctrl, and the initial trigger signal STV should be high-level pulses.

In addition, it is to be noted that in the first stage T1, the first transistor M1, the third transistor M3, and the fourth transistor M4 need to be turned on at the same time in order for the third node N3 to output the first level signal V1. Therefore, it needs to be satisfied that the frequency control signal CS, the trigger control signal STV_Ctrl, and the initial trigger signal STV are all in the effective pulse stage, that is, the three signals work together to control the start of the first stage T1. It is a necessary condition that the three signals are all in the effective pulse stage. In the second stage T2, the first transistor M1 or the third transistor M3 needs to be controlled to be turned off, so as to prevent the third node N3 from outputting the first level signal V1. Therefore, the frequency control signal CS or the trigger control signal STV_Ctrl just needs to be in an ineffective pulse stage. Moreover, it can be seen from the timing shown in FIGS. 11 and 12 that the control circuit 40 is actually a circuit structure that controls, through the frequency control signal CS and the trigger control signal STV_Ctrl, whether the initial trigger signal STV is outputted. The frequency control signal CS and the trigger control signal STV_Ctrl can control the timing and number of effective pulses outputted by the initial trigger signal STV, that is, the frequency control signal CS and the trigger control signal STV_Ctrl can control the frequency and the duty cycle of the outputted first trigger signal STV1 or the outputted second trigger signal STV2, so as to satisfy the requirements of the first driving portion 11 and the second driving portion 12 for the trigger signals.

With continued reference to FIGS. 8, 9, and 10, in the case where the first module 41 of the first control unit 401 receives the first frequency control signal CS1, the second module 42 of the first control unit 401 receives the first trigger control signal STV_Ctrl1. In the case where the first module 41 of the second control unit 402 receives the second frequency control signal CS2, the second module 42 of the second control unit 402 receives the second trigger control signal STV_Ctrl2.

As mentioned above, the normal operation of the control unit 40 requires the first module 41 and the second module 42 to operate synchronously, that is, the first module 41 and the second module 42 need to receive corresponding control signals at the same time, that is, when the first module 41 receives the frequency control signal CS, the second module 42 receives the trigger control signal STV_Ctrl at the same time. For the first control unit 401 and the second control unit 402 that provide the trigger signals STV for the first driving portion 11 and the second driving portion 12, respectively, the first modules 41 and the second modules 42 essentially receive different frequency control signals CS and different trigger control signals STV_Ctrl, that is, the first module 41 of the first control unit 401 receives the first frequency control signal CS1, and the second module 42 of the first control unit 401 receives the first trigger control signal STV_Ctrl1; and the first module 41 of the second control unit 402 receives the second frequency control signal CS2, and the second module 42 of the second control unit 402 receives the second trigger control signal STV_Ctrl2.

With continued reference to FIG. 8, the display panel includes a first frequency control signal line Line_CS1 and a second frequency control signal line Line_CS2. The first frequency control signal line Line_CS1 is configured to provide the first frequency control signal CS1 for the first control unit 401, and the second frequency control signal line Line_CS2 is configured to provide the second frequency control signal CS2 for the second control unit 402.

In this embodiment, different frequency control signals CS are separately provided for the first module 41 in the first control unit 401 and the first module 41 in the second control unit 402 essentially through two signal lines. The first frequency control signal line Line_CS1 provides the first frequency control signal CS1 for the first module 41 of the first control unit 401, and the second frequency control signal line Line_CS2 provides the second frequency control signal CS2 for the first module 41 of the second control unit 402.

Figure 13:
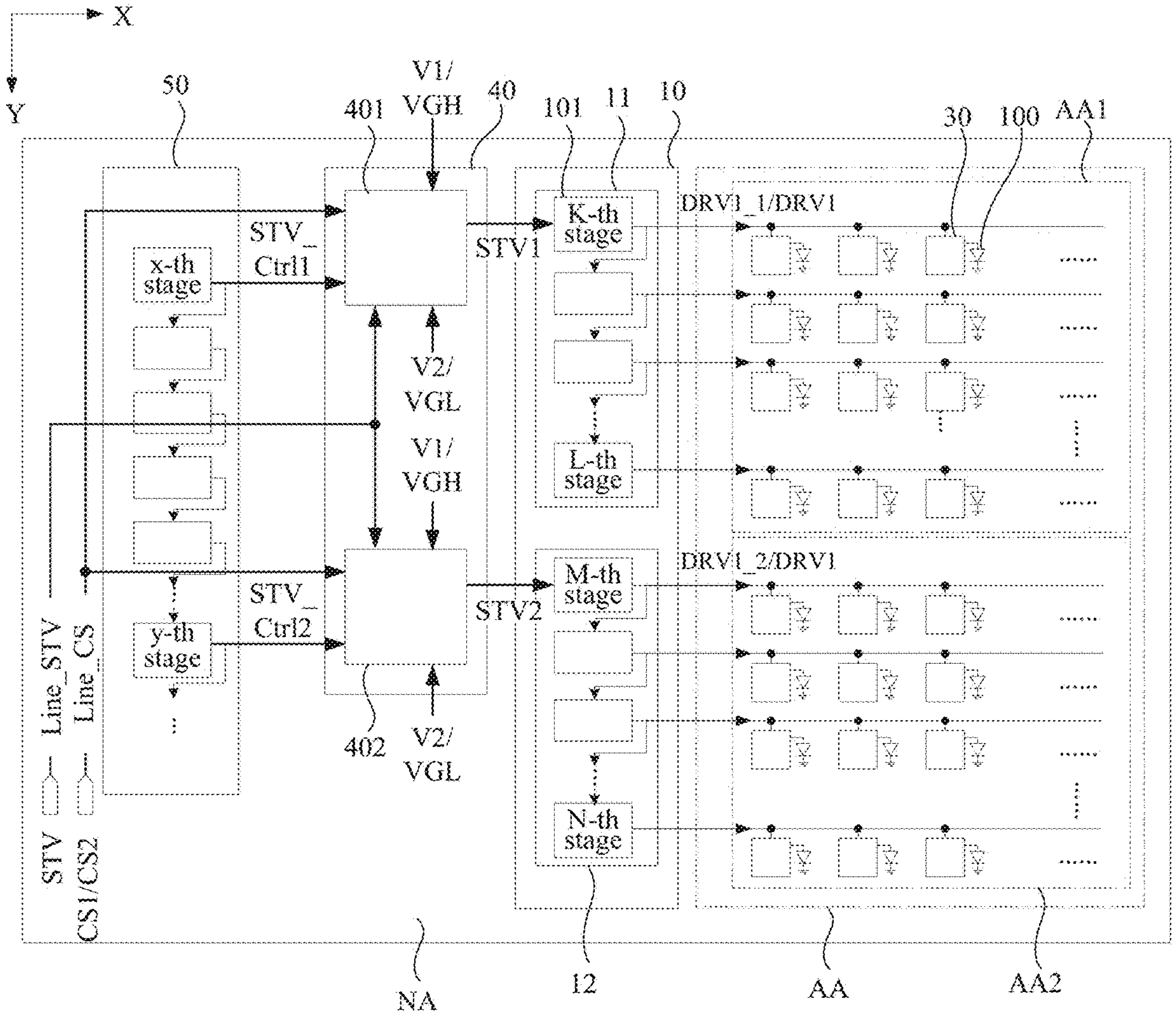
FIG. 13 is a structural diagram of another display panel according to an embodiment of the present disclosure.

FIG. 13 is a structural diagram of another display panel according to an embodiment of the present disclosure. Referring to FIG. 13, in another embodiment of the present disclosure, the display panel may be configured to include a frequency control signal line Line_CS. In the case where the first driving portion 11 outputs the first sub-drive signal DRV1_1, the frequency control signal line Line_CS provides the first frequency control signal CS1 for the first control unit 401; and in the case where the second driving portion 12 outputs the second sub-drive signal DRV1_2, the frequency control signal line Line_CS provides the second frequency control signal CS2 for the second control unit 402.

First, the process of the first driving portion 11 and the second driving part 12 outputting the first drive signals DRV1 is essentially the process of generating the first drive signals DRV1 after the trigger of the trigger signals STV provided by the corresponding control units 40, and the process of the control units 40 outputting the trigger signals STV is the process of generating the trigger signals STV by the control units 40 controlled by the frequency control signals received by the first module 41. Therefore, for any corresponding group of the control unit 40 and the driving portion, in the case where the driving portion outputs the first drive signal DRV1, the corresponding control unit 40 is controlled by the frequency control signal CS to work, that is, in the case where the first driving portion 11 outputs the first sub-drive signal DRV1_1, the first control unit 401 receives the first frequency control signal CS1, and in the case where the second driving portion 12 outputs the second sub-drive signal DRV1_2, the second control unit 402 receives the second frequency control signal CS2.

Further, comparing FIG. 8 with FIG. 13, it can be seen that in the embodiment shown in FIG. 13, only one frequency control signal line Line_CS is provided, and this frequency control signal line Line_CS is connected to the first module 41 of the first control unit 401 and the first module 41 of the second control unit 402 at the same time. Therefore, the first frequency control signal CS1 and the second frequency control signal CS2 can be provided for the first control unit 401 and the second control unit 402, respectively in a time-sharing manner or another manner. For example, a selector or a selector switch may be disposed on the frequency control signal line Line_CS and is responsible for connecting the frequency control signal line Line_CS to the first control unit 401 or the second control unit 402 so that two frequency control signals CS provided by the frequency control signal Line Line_CS in a time-sharing manner are separately provided for the first driving portion 11 and the second driving portion 12. The selector or the selector switch can control gating through corresponding timing signals. In the embodiments of the present disclosure, the selector or the selector switch and timing control signals can be set according to actual requirements, without excessive limitations here.

As mentioned above, in addition to the control of the frequency control signal CS and the initial trigger signal STV, the control unit 40 also needs to be controlled by the trigger control signal STV_Ctrl. For the implementation of the trigger control signal STV_Ctrl, the embodiments of the present disclosure provide a specific display panel structure.

Figure 14:
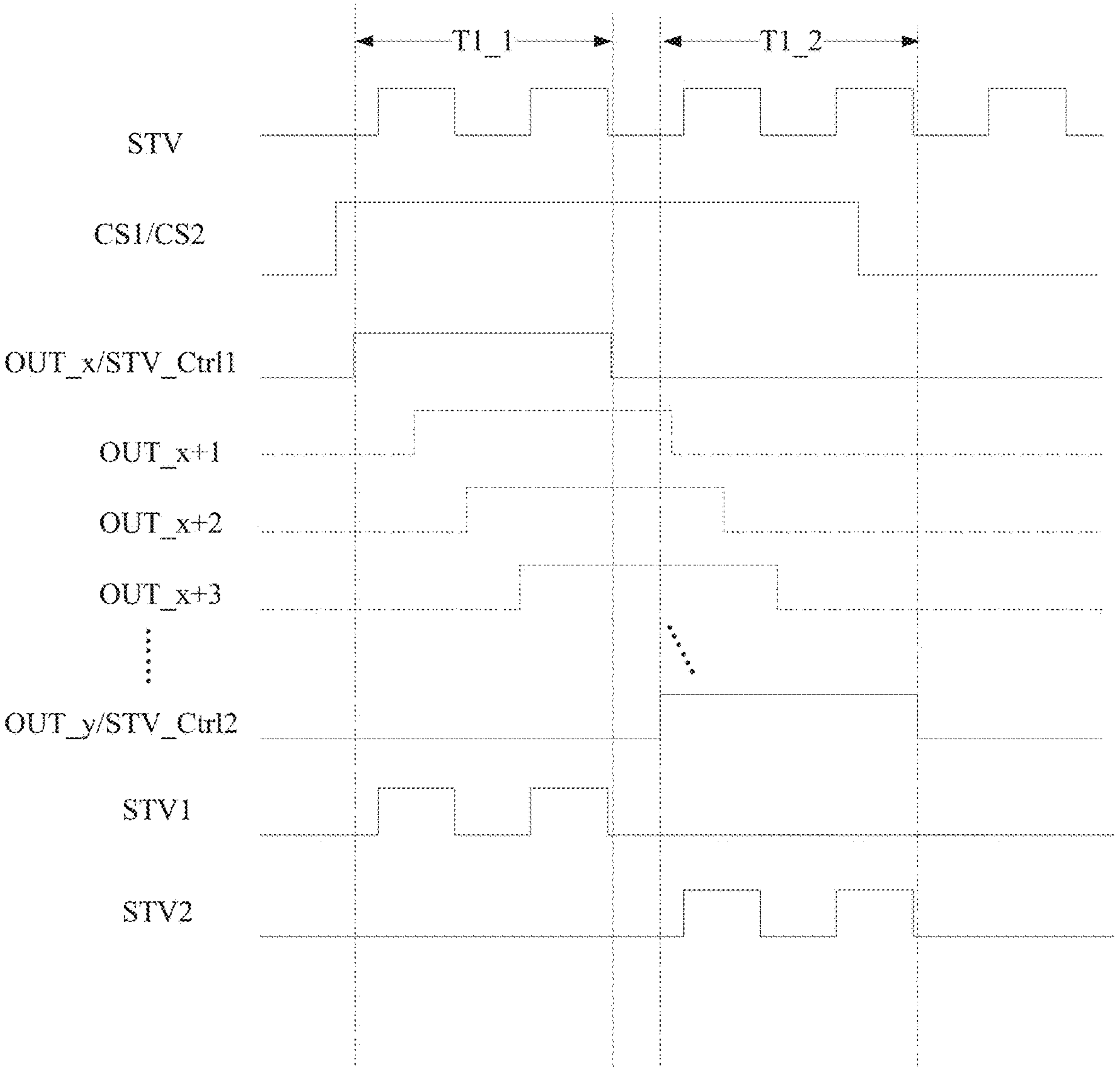
FIG. 14 is a drive timing diagram of the display panel shown in FIG. 13.

FIG. 14 is a drive timing diagram of the display panel shown in FIG. 13. With continued reference to FIGS. 13 and 14, the display panel further includes a trigger control driver circuit 50 configured to output the trigger control signal STV_Ctrl. The first trigger control signal STV_Ctrl1 is the x-th stage of output signal OUT_x outputted by the trigger control driver circuit 50, and the second trigger control signal STV_Ctrl2 is the y-th stage of output signal OUT_y outputted by the trigger control driver circuit 50, where $x \geq 1$, and $y \geq 1$. An effective pulse stage of the x-th stage of output signal OUT_x acting on the first control unit 401 does not overlap an effective pulse stage of the y-th stage of output signal OUT_y acting on the second control unit 402.

The main purpose of setting the trigger control driver circuit 50 is to generate and provide the first trigger control signal STV_Ctrl1 and the second trigger control signal STV_Ctrl2 for the first control unit 401 and the second control unit 402, respectively, thereby controlling the first control unit 401 and the second control unit 402 to generate and provide the first trigger signal STV1 and the second trigger signal STV2 for the first driving portion 11 and the second driving portion 12, respectively. At the same time, the trigger control driver circuit 50 is also configured to control, through the generated first trigger control signal STV_Ctrl1 and the generated second trigger control signal STV_Ctrl2, the time when the first control unit 401 and the second control unit 402 output the first trigger signal STV1 and the second trigger signal STV2. It is to be understood that since the K-th stage to the L-th stage of shift registers 101 in the first driving portion 11 correspondingly drive the pixel circuits 30 in the K-th row to the L-th row, and the M-th to the L-th stages of shift registers 101 in the second driving portion 12 correspondingly drive the pixel circuits 30 in the M-th row to the N-th row. To prevent the working time of the pixel circuits 30 in the K-th row to the L-th row overlapping the working time of the pixel circuits 30 in the M-the row to the N-th row, the first driving portion 11 and the second driving portion 12 need to start the shift output operation at different times, that is, it is required that the effective pluses of the first trigger signal STV1 received by the first driving portion 11 do not overlap the effective pulses of the second trigger signal STV2 received by the second driving portion 12. The first trigger control signal STV_Ctrl1 and the second trigger control signal STV_Ctrl2 correspondingly control the first control unit 401 and the second control unit 402 to generate the first trigger signal STV1 and the second trigger signal STV2, respectively. Therefore, it is required that the effective pulses of the first trigger control signal STV_Ctrl1 do not overlap the effective pulses of the second trigger control signal STV_Ctrl2, thereby ensuring that the working time of the first driving portion 11 does not overlap the working time of the second driving portion 12, ensuring that the working time of the pixel circuits 30 in the K-th row to the L-th row does not overlap the working time of the pixel circuits 30 in the M-th row to the N-th row, avoiding the pixel row synchronization display problem in the panel, and avoiding confusion in the display order of the pixel rows. As shown in the example of FIG. 14, first, the effective pulses (high-level pulses) of stages of output signals OUT_n outputted by the trigger control driver circuit 50 are shifted in a cascade manner in sequence. Based on this, correspondingly, the effective pulses (high-level pulses) of the x-th stage of output signal OUT_x do not overlap the effective pulses (high-level pulses) of the y-th stage of output signal OUT_y, that is, the effective pulses of the first trigger control signal STV_Ctrl1 do not overlap the effective pulses of the second trigger control signal STV_Ctrl2. Based on FIGS. 11 and 12 and the working principle of the control unit, it can be seen that the number and the timing positions of the effective pulses of the initial trigger signals STV outputted by the first control unit 401 and the second control unit 402 are determined by the overlapping part of the effective pluses of the frequency control signals CS and the trigger control signals STV_Ctrl, that is, the first stage T1. In the example case where the first control unit 401 and the second control unit 402 receive the same frequency control signals CS, the effective pulses of the first trigger signal STV1 outputted by the first control unit 401 are located in the first stage of the first control unit 401, that is, the stage T1_1, and the effective pulses of the second trigger signal STV2 outputted by the second control unit 402 are located in the first stage of the second control unit 402, that is, the stage T1_2. In this manner, the effective pulses of the first trigger signal STV1 do not overlap the effective pulses of the second trigger signal STV2 so that the working time of the first driving portion 11 driven by the first trigger signal STV1 does not overlap the working time of the second driving portion 12 driven by the second trigger signal STV2, thereby avoiding the pixel row synchronization display problem in the panel. Further, it can be seen from FIG. 14 that in the display panel structure shown in FIG. 13, in the case where the first control unit 401 and the second control unit 402 are properly configured to receive different frequency control signals CS, the number of effective pulses of the first trigger signal STV1 may be different from the number of effective pulses of the second trigger signal STV2. That is, the frequency control signals CS mate with the trigger control signals STV_Ctrl, so as to adjust the number of effective pulses of the first trigger signal STV1 or the second trigger signal STV2, change the pulse change frequency of the first trigger signal STV1 and the pulse change frequency of the second trigger signal STV2, and adjust the working frequency of the first driving portion 11 and the working frequency of the second driving portion 12, thereby adjusting the refresh frequency of the pixel circuits 30 in the first sub-display region AA1 and the refresh frequency of the pixel circuits 30 in second sub-display region AA2 and achieving that refresh frequencies can be controlled separately for different regions in the display panel.

The trigger control driver circuit 50 here may specifically be a cascade circuit and can provide output signals OUT_n that are shifted based on the timing in sequence. According to the shifting timing, the x-th stage of output signal OUT_x and the y-th stage of output signal OUT_y in the trigger control driver circuit 50 may be used as the first trigger control signal STV_Ctrl1 and the second trigger control signal STV_Ctrl2 provided for the first control unit 401 and the second control unit 402, respectively, so as to generate the first trigger signal STV1 and the second trigger signal STV2 with a time interval to ensure that the working time of the first driving portion 11 does not overlap the working time of the second driving portion 12, where the effective pulses of the x-th stage of output signal OUT_x do not overlap the effective pulses of the y-th stage of output signal OUT_y. It is to be added that, with continued reference to FIG. 14, the interval between the effective pulses is adjustable on the premise that the effective pulses of the x-th stage of output signal and the y-th stage of output signal in the trigger control driver circuit 50 do not overlap. In other words, those skilled in the art can select and set the specific values of x and y according to the principle that after the scanning of the pixel circuit rows actually driven by the first driving portion 11 is completed, the scanning of the pixel circuit rows driven by the second driving portion 12 starts so that pixel rows are scanned in sequence without gaps.

Figure 15:
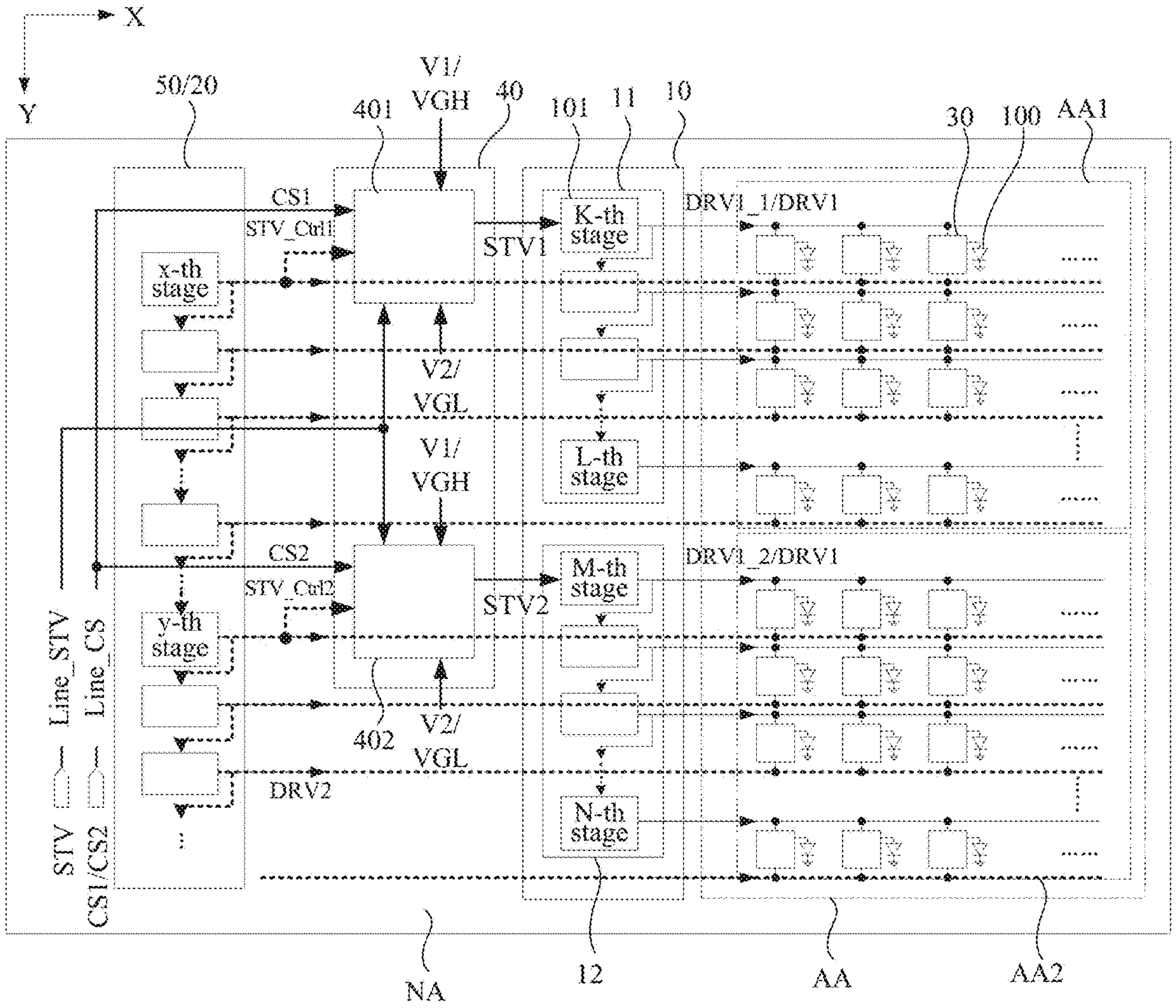
FIG. 15 is a structural diagram of another display panel according to an embodiment of the present disclosure.

FIG. 15 is a structural diagram of another display panel according to an embodiment of the present disclosure. Referring to FIG. 15, in this embodiment, the display panel further includes a second driver circuit 20 configured to provide a second drive signal DRV2 for the pixel circuit 30, wherein the second driver circuit 20 also serves as the trigger control driver circuit 50, and the second drive signal DRV2 also serves as the trigger control signal STV_Ctrl.

The second drive signal DRV2 provided by the second driver circuit 20 is also a necessary signal for the operation of the pixel circuit 30 and can mate with the first drive signal DRV1 to drive the pixel circuit 30 to work normally so that the light-emitting element 100 emits light, and the entire display panel achieves the display of the image. With continued reference to FIG. 4, the pixel circuit 30 may include the drive module 31, the data write module 32, the compensation module 33, the reset module 34, the bias adjustment module 35, the initialization module 36, and the light emission control module 37. Based on the working process of the pixel circuit 30, the second driver circuit 20 is responsible for providing the second drive signal DRV2 for some modules in the pixel circuit 30. For example, the second driver circuit 20 may provide the light emission control signal Emit for the light emission control module 37, that is, the second drive signal DVR2 is actually the light emission control signal Emit. Alternatively, the second driver circuit 20 may provide the bias adjustment control signal SP2 for the bias adjustment module 35, that is, the second drive signal DVR2 is actually the bias adjustment control signal SP2. Therefore, the second driver circuit 20 can actually drive the pixel circuit 30 to implement a light emission control function, a potential biasing function of the drive transistor T0, or an anode initialization function of the light-emitting element 100.

It is to be understood that the second driver circuit 20 provides the light emission control signal Emit or the bias adjustment control signal SP2 for each row of pixel circuits 30. This is actually based on the fact that the second driver circuit 20 and the first driver circuit 10 are the same and both are cascade circuits in which multiple stages of shift registers are connected in a cascade manner, where the multiple stages of shift registers can correspondingly provide the sequentially shifted light emission control signals Emit or bias adjustment control signals SP2 for rows of pixel circuits 30 so that rows of pixel circuits 30 are turned on in sequence, that is, the row-by-row scanning or display function of the entire display panel is implemented. Based on the preceding second driver circuit 20, in this embodiment, the second driver circuit 20 also serves as the trigger control driver circuit 50, and the sequentially shifted second drive signals DRV2 outputted by the second driver circuit 20 also serve as the trigger control signals STV_Ctrl.

Further, the x-th stage of second drive signal DRV2 also serves as the first trigger control signal STV_Ctrl1, and the y-th stage of second drive signal DRV2 also serves as the second trigger control signal STV_Ctrl2.

As mentioned above, the x-th stage of output signal and the y-th stage of output signal of the trigger control driver circuit 50 may be used as the first trigger control signal STV_Ctrl1 and the second trigger control signal STV_Ctrl2. Correspondingly, in the case where the second driver circuit 20 also serves as the trigger control driver circuit 50, the x-th stage of second dive signal DRV2 and the y-th stage of second drive signal DRV2 of the second driver circuit 20 may be used as the first trigger control signal STV_Ctrl1 and the second trigger control signal STV_Ctrl2, respectively.

It is to be added here that the first driver circuit 10, the control unit 40, the trigger control driver circuit 50, and the second driver circuit 20 shown in the embodiment of the present disclosure are all disposed in the non-display region NA, and the specific positions are only examples, can be designed by those skilled in the art according to actual bezel requirements, and are not limited in the present disclosure.

Further, based on the pixel circuit shown in FIG. 4, in the embodiment of the present disclosure, the pixel circuit 30 may be configured to include a first preset module and a second preset module, where a control terminal of the first preset module receives the first drive signal DRV1, and a control terminal of the second preset module receives the second drive signal DRV2. The pulse change frequency of the first drive signal DRV1 is Fp1, and the pulse change frequency of the second drive signal DRV2 is Fp2, where $Fp1 \leq Fp2$.

Here, the first preset module and the second preset module are essentially two modules in the pixel circuit 30 that can have different working frequencies. The two modules are drivable through the first drive signal DRV1 and the second drive signal DRV2 with different pulse change frequencies. The pulse change frequency Fp1 of the first drive signal DRV1 is less than or equal to the pulse change frequency Fp2 of the second drive signal DRV2, which means that the working frequency of the first preset module is less than or equal to the working frequency of the second preset module. According to the working process of the pixel circuit 30, it can be seen that, in a complete data refresh frame Tdata of the pixel circuit 30, in the bias stage (initialization stage) Ta, the bias adjustment module 35 is turned on once, and the initialization module 36 is turned on once; in the reset stage Tb, the reset module 34 is turned on once; in the data write stage TC, the data write module 32 and the compensation module 33 are turned on once; and in the light emission stage Td, the light emission control module 37 is turned on once. Therefore, it can be seen that, generally speaking, the working frequencies of the modules in the pixel circuit 30 are kept consistent, and the pulse change frequencies of the drive signals driving the modules are also consistent. That is, in the embodiment of the present disclosure, the pulse change frequencies of the first drive signal DRV1 and the second drive signal DRV2 correspondingly provided by the first driving portion 10 and the second driving portion 20 are equal.

Figure 16:
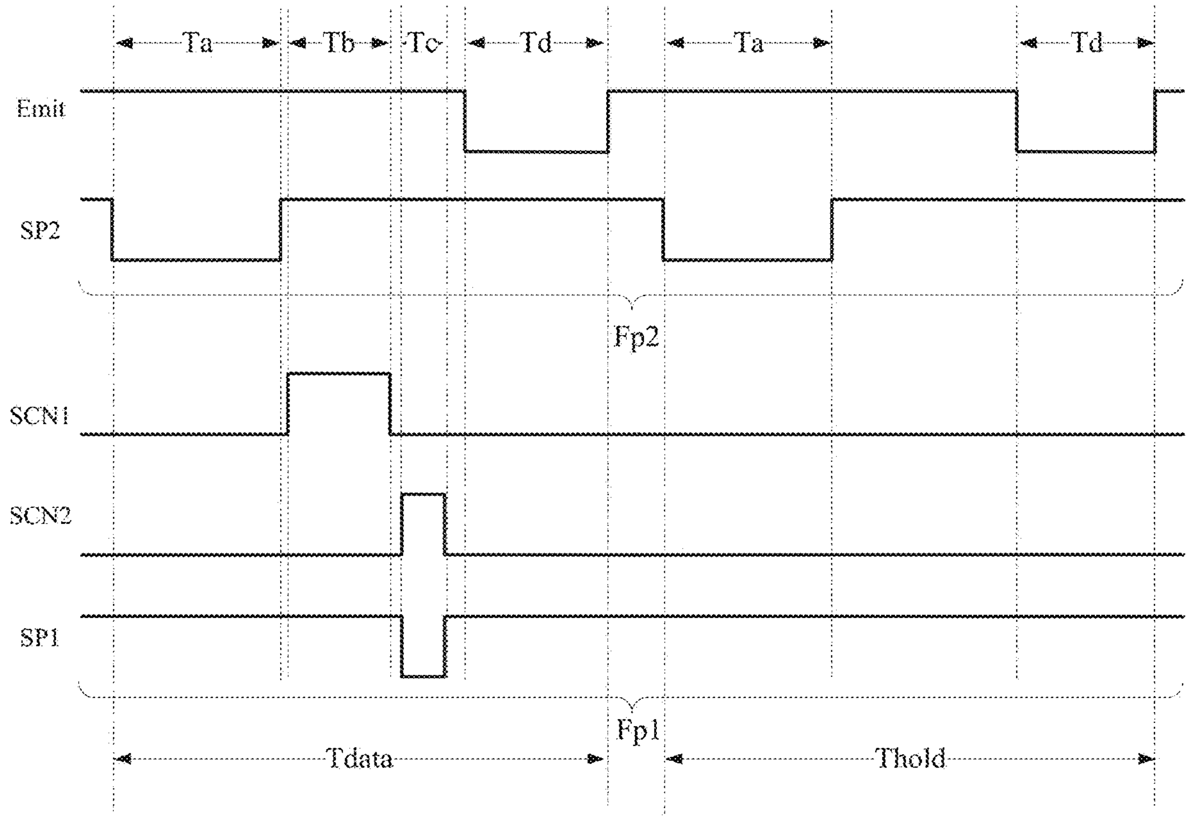
FIG. 16 is another drive timing diagram of the pixel circuit shown in FIG. 4.

However, in some cases, there may be differences in the pulse change frequencies of the drive signals of different modules in the pixel circuit 30. FIG. 16 is another drive timing diagram of the pixel circuit shown in FIG. 4. Comparing FIG. 5 with FIG. 16, in the working process of the pixel circuit 30, a data retention frame Thold may be set after the data refresh frame Tdata. The function of the data retention frame Thold is to use the data signal data stored in the storage capacitor C1 in the data refresh frame Tdata to directly control the light emission without performing a data write step. Specifically, the data retention frame Thold includes the bias stage (initialization stage) Ta and the light emission stage Td, and the reset stage Tb and the data write stage TC are not set in the data retention frame Thold. Therefore, in the data retention frame Thold, the pulses of the drive signal that controls the reset stage Tb, that is, the first scan signal SCN1 and the pulses of the drive signals that control the data write stage TC, that is, the data write control signal SP1 and the second scan signal SCN2 are all maintained as ineffective pulses, while the drive signal that controls the bias stage (initialization stage) Ta, that is, the bias adjustment control signal SP2 and the drive signal that controls the light emission stage Td, that is, the light emission control signal Emit both have effective pulses. Further, it can be seen that in the working process of the pixel circuit 30 having the data refresh frame Tdata and the data retention frame Thold, the number of effective pulses of the first scan signal SCN1, the data write control signal SP1, and the second scan signal SCN2 is less than the number of effective pulses of the bias adjustment control signal SP2 and the light emission control signal Emit, that is, the pulse change frequency of the drive signals of the initialization module 36, the reset module 34, the data write module 32, and the compensation module 33 is less than the pulse change frequency of the drive signals of the bias adjustment module 35 and the light emission control module 37.

In view of the fact that the drive signals of different modules in the preceding pixel circuit 30 have different pulse change frequencies, in the embodiment of the present disclosure, essentially, the first driver circuit 10 is configured to provide the first drive signal DRV1 with a lower pulse change frequency, and the second driver circuit 20 is responsible for providing the second drive signal DRV2 with a higher pulse change frequency. The second drive signal DRV2 with a higher pulse change frequency may be understood as a drive signal with an effective pulse in each display frame, such as the bias adjustment control signal SP2 or the light emission control signal Emit, while the first drive signal DRV1 with a lower pulse change frequency may be understood as a drive signal with the effective pulse only in part of the display frames (the data refresh frame), such as the first scan signal SCN1, the data write control signal SP1, or the second scan signal SCN2. It can be seen from this that in each display frame, the second driver circuit 20 outputs the second drive signals DVR2, and the outputted second drive signal DRV2 of each stage drives the pixel circuits 30 in each row to be in the corresponding working stage in one-to-one correspondence. For example, each stage of light emission control signal Emit correspondingly controls the pixel circuits 30 in each row to be in the light emission stage Td. Based on this, it is to be understood that in the embodiment of the present disclosure, the second driver circuit 20 is configured to provide the second drive signal DRV2 with a higher pulse change frequency, and the first driver circuit 10 is configured to provide the first drive signal DRV1 with a lower pulse change frequency. The main reason is described below. The first driver circuit 10 is responsible for providing the first drive signals for the pixel circuits 30 in the K-th row to the L-th row and the pixel circuits 30 in the M-th row to the N-th row. In the case where the process of the first driving portion 11 providing the first sub-drive signal DRV1_1 for the pixel circuits 30 in the K-th row to the L-th row switches to the process of the second driving portion 12 providing the second sub-drive signal DRV1_2 for the pixel circuits 30 the M-th row to the N-th row, whether the first driving portion 11 has shifted to the point where the L-th stage of shift register 101 outputs the first sub-drive signal DRV1_1 cannot be determined, and further the triggering time when the second driving portion 12 outputs the second sub-drive signal DRV1_2 cannot be determined. As mentioned above, in each display frame, the second driver circuit 20 outputs the second drive signals DVR2, and each stage of second drive signal DRV2 drives the pixel circuits 30 in the corresponding row. In the case where after the L-th stage of shift register 101 in the first driving portion 11 outputs the first sub-drive signal DRV1_1 for the pixel circuits 30 in the L-th row, the M-th stage of shift register 101 in the second driving portion 12 outputs the second sub-drive signal DRV1_2 for the pixel circuits 30 in the M-th row, the second drive signal DRV2 corresponding to the pixel circuits 30 in the M-th row outputs effective pulses. That is, the second drive signal DRV2 corresponding to the pixel circuits 30 in the M-th row may be used as the trigger control signal, and the M-th stage of shift register 101 is triggered by the control unit 40 and the second driving portion 12 to work and generate the second sub-drive signal DRV1_2, thereby ensuring that the timing of the second driving portion 12 providing the second sub-drive signal DRV1_2 is exactly connected to the timing of the first driving portion 11 providing the first sub-drive signal DRV1_1, avoiding the problem of display confusion caused by the overlapping or gap between the time periods when the first driving portion 11 and the second driving portion 12 drive different pixel rows, and ensuring the fluency of the screen display.

With continued reference to FIG. 4, the pixel circuit 30 may include the drive module 31, the data write module 32, the compensation module 33, and the reset module 34, the drive module 31 includes the drive transistor T0, and the corresponding modules are connected as described above. The details are not repeated here. In an optional embodiment, the first preset module may be configured to be the data write module 32; or the first preset module may be configured to be the compensation module 33; or the first preset module may be configured to be the reset module 34.

With continued reference to FIGS. 5 and 16, as mentioned before, the pulse change frequency Fp1 of the first drive signal DRV1 received by the first preset module is less than or equal to the pulse change frequency Fp2 of the second drive signal DRV2 received by the second preset module. That is, the first preset module is essentially a module in the pixel circuit 30 in which the pulse change frequency of the drive signal may be configured to be relatively low. In the working process of the pixel circuit 30, in addition to setting the data refresh frame Tdata, the data retention frame Thold may also be added, and the data write module 32, the compensation module 33, and the reset module 34 only work in the data refresh frame Tdata, so the pulse change frequencies of the required drive signals, that is, the data write control signal SP1, the second scan signal SCN2, and the first scan signal SCN1 are relatively low. Therefore, any one of the data write module 32, the compensation module 33, or the reset module 34 may be used as the first preset module.

With continued reference to FIG. 4, the pixel circuit 30 may include the drive module 31 and the bias adjustment module 35, the drive module 31 includes the drive transistor T0, and the corresponding modules are connected as described above. The details are not repeated here. In an optional embodiment, the first preset module may be configured to be the bias adjustment module 35; or the second preset module may be configured to be the bias adjustment module 35.

With continued reference to FIGS. 5 and 16, the pulse change frequency Fp1 of the first drive signal DRV1 received by the first preset module is less than or equal to the pulse change frequency Fp2 of the second drive signal DRV2 received by the second preset module. That is, the second preset module is essentially a module in the pixel circuit 30 in which the pulse change frequency of the drive signal may be configured to be relatively high. In the pixel circuit 30, the bias adjustment module 35 needs to work in each display frame, and the pulse change frequency of the required bias adjustment control signal SP2 is relatively high, so the bias adjustment module 35 may be used as a second preset module 301.

Figure 17:
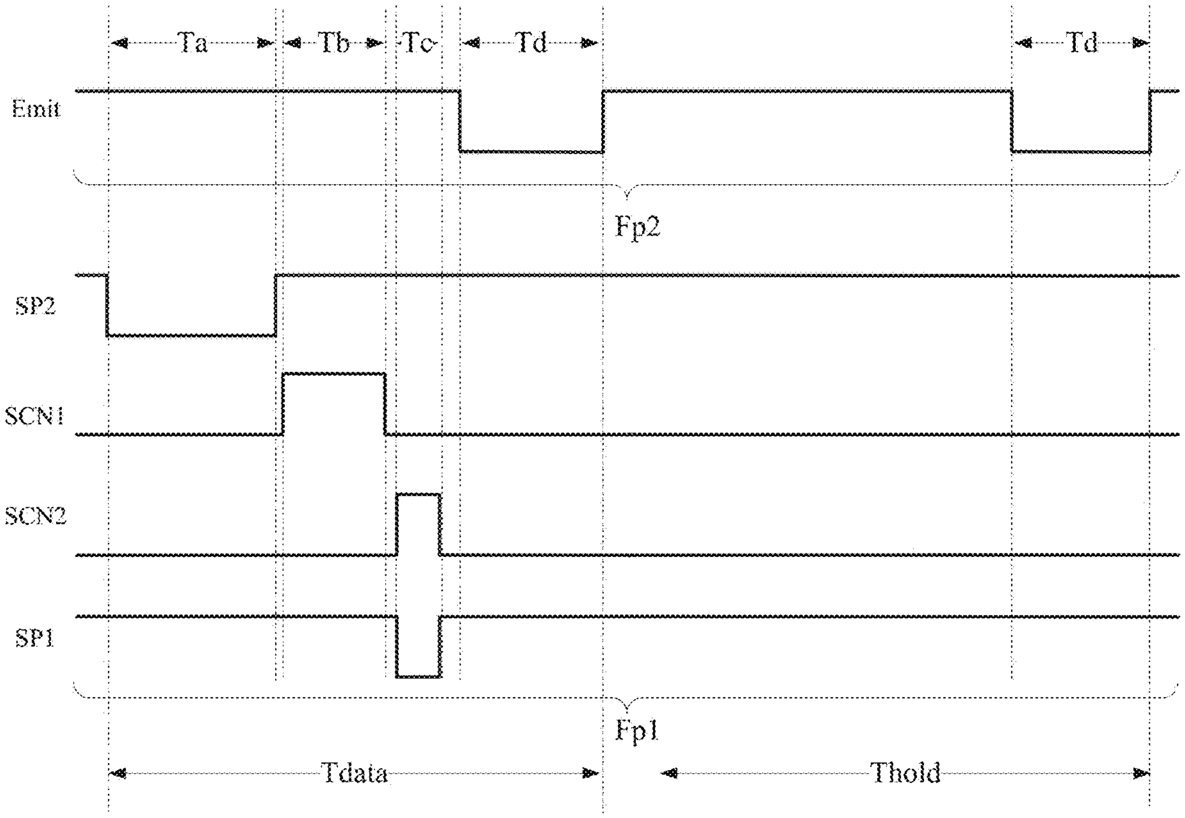
FIG. 17 is another drive timing diagram of the pixel circuit shown in FIG. 4.

FIG. 17 is another drive timing diagram of the pixel circuit shown in FIG. 4. Comparing FIG. 16 with FIG. 17, it can be seen that in other embodiments of the present disclosure, the bias adjustment module 35 may work only in part of the display frames, such as the data refresh frame Tdata, that is, the pulse change frequency of the bias adjustment control signal SP2 is relatively low, so the bias adjustment module 35 may be used as the first preset module.

With continued reference to FIGS. 4, 16, and 17, the pixel circuit 30 may include the drive module 31 and the initialization module 36, the drive module 31 includes the drive transistor T0, and the corresponding modules are connected as described above. The details are not repeated here. In an optional embodiment, the first preset module may be configured to be the initialization module 36; or the second preset module may be configured to be the initialization module 36.

Since the bias adjustment module 35 and the initialization module 36 receive the same control signal SP2 and are controlled by the same control signal SP2, the initialization module 36 and the bias adjustment module 35 actually work synchronously and have the same working frequency. Therefore, similarly, it can be seen that in the case where the initialization module 36 works in any display frame, as shown in FIG. 16, the initialization module 36 may be used as the second preset module; and in the case where the initialization module 36 works only in part of the display frames, as shown in FIG. 17, the initialization module 36 may be used as the first preset module.

With continued reference to FIG. 4, the pixel circuit 30 includes the drive module 31 and the light emission control module 37, the drive module 31 includes the drive transistor T0, and the corresponding modules are connected as described above. The details are not repeated here. In an optional embodiment, the second preset module may be configured to be the light emission control module 37.

The pulse change frequency Fp1 of the first drive signal DRV1 received by the first preset module is less than or equal to the pulse change frequency Fp2 of the second drive signal DRV2 received by the second preset module. That is, the second preset module 301 is essentially a module in the pixel circuit 30 in which the pulse change frequency of the drive signal may be configured to be relatively high. In the pixel circuit 30, with continued reference to FIGS. 16 and 17, the light emission control module 37 needs to work in each display frame, and the pulse change frequency of the required light emission control signal Emit is relatively high, which is Fp2, so the light emission control module 37 may be used as the second preset module.

Further, with continued reference to FIGS. 4 and 10, an effective pulse stage of the second drive signal DRV2 acting on the control unit 40 is an ineffective pulse stage of the second drive signal DRV2 acting on the light emission control module 37.

The light emission control module 37 is configured to be the second preset module, which means that the light emission control signal Emit is the second drive signal DRV2. For the light emission control module 37, an effective pulse stage of the light emission control signal Emit is a stage in which the light emission control module 37 is controlled to be turned on, which depends on the types of transistors in the light emission control module 37. As shown in FIG. 4, in the case where the first light emission control sub-module 371 and the second light emission control sub-module 372 in the light emission control module 37 are both P-type transistors and the light emission control signal Emit is in a low-level pulse stage, the first light emission control sub-module 371 and the second light emission control sub-module 372 are turned on, and the pixel circuit 30 is in the light emission stage Td at this time. For the control unit 40, the effective pulse stage of the light emission control signal Emit is a stage in which the control unit 40 is controlled to be turned on, which depends on the types of transistors in the control unit 40. As shown in FIG. 10, the second module 42 in the control unit 40 is controlled by the light emission control signal Emit. In the case where the second module 42 is an N-type transistor and the light emission control signal Emit is in a high-level pulse stage, the second module 42 is turned on.

In this embodiment, the effective pulse stage of the light emission control signal Emit acting on the control unit 40 is configured to be the ineffective pulse stage of the light emission control signal Emit acting on the light emission control module 37, which means that in the case where the light emission control signal Emit controls the light emission control module 37 to be in the off state, that is, before the pixel circuit 30 is in the light emission stage Td, the second module 42 in the control unit 40 may be controlled by the light emission control signal Emit to be turned on. Therefore, before the pixel circuit 30 is in the light emission stage Td, the control unit 40 may be controlled by the light emission control signal Emit, the frequency control signal CS, and the initial trigger signal STV to work and generate the first trigger signal STV1 or the second trigger signal STV2, and then the first driver circuit 10 generates and provides the first drive signal DRV for the first preset module in the pixel circuit 30, such as the preceding data write module 32, the compensation module 33, or the reset module 34, thereby ensuring that the pixel circuit 30 can implement the gate reset function, the data write function, or the threshold compensation function before the light emission stage Td.

Figure 18:
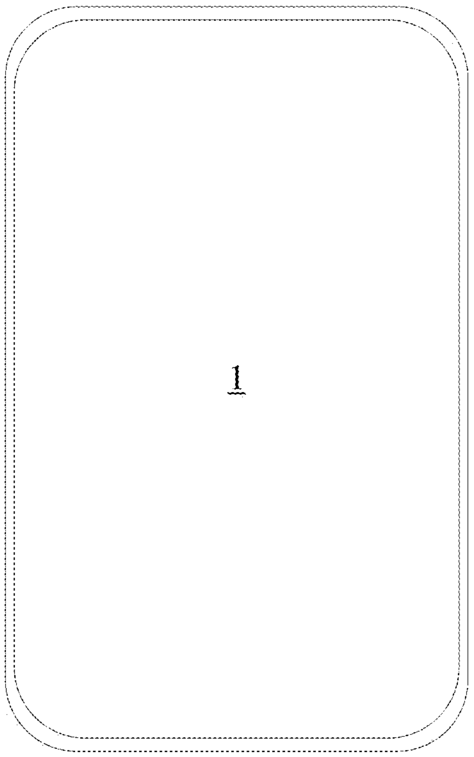
FIG. 18 is a structural diagram of a display device according to an embodiment of the present disclosure.

Based on the same inventive concept, an embodiment of the present disclosure further provides a display device. FIG. 18 is a structural diagram of a display device according to an embodiment of the present disclosure. Referring to FIG. 18, the display device includes a display panel 1 provided in any embodiment of the present disclosure. Therefore, the display device provided in the embodiment of the present disclosure has the corresponding beneficial effects of the display panel provided in the embodiments of the present disclosure. The details are not repeated here. For example, the display device may be an electronic device such as a mobile phone, a computer, a smart wearable device (for example, a smart watch), or an in-vehicle display device, which is not limited in the embodiment of the present disclosure.

It is to be noted that the preceding are only preferred embodiments of the present disclosure and the technical principles used therein. It is to be understood by those skilled in the art that the present disclosure is not limited to the embodiments described herein. Those skilled in the art can make various apparent modifications, adaptations, combinations, and substitutions without departing from the scope of the present disclosure. Therefore, while the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A display panel, comprising:

a first driver circuit and a pixel circuit, wherein the first driver circuit is configured to provide a first drive signal for the pixel circuit, wherein the first drive signal comprises a first sub-drive signal and a second sub-drive signal;

wherein the first driver circuit comprises a first driving portion and a second driving portion;

wherein the first driving portion comprises a K-th stage to an L-th stage of shift registers and is configured to output the first sub-drive signal, and the second driving portion comprises an M-th stage to an N-th stage of shift registers and is configured to output the second sub-drive signal, wherein $K \geq 1$, $L \geq 1$, $M \geq 1$, and $N \geq 1$; and a pulse change frequency of the first sub-drive signal is F1, and a pulse change frequency of the second sub-drive signal is F2;

wherein $F1 \neq F2$, wherein the display panel comprises a control circuit receiving at least an initial trigger signal;

wherein the control circuit comprises a first control circuit and a second control circuit; wherein the first control circuit and the second control circuit satisfy at least one of:

the first control circuit is configured to receive at least the initial trigger signal and output a first trigger signal, and an output terminal of the first control circuit is connected to the K-th stage of shift register and is configured to provide the first trigger signal for the K-th stage of shift register; or the second control circuit is configured to receive at least the initial trigger signal and output a second trigger signal, and an output terminal of the second control circuit is connected to the M-th stage of shift register and is configured to provide the second trigger signal for the M-th stage of shift register.

2. The display panel of claim 1, wherein the K-th stage of shift register is configured to receive the first trigger signal, and the K-th stage to the L-th stage of shift registers shift the first trigger signal and output the first sub-drive signal; and the M-th stage of shift register is configured to receive the second trigger signal, and the M-th stage to the N-th stage of shift registers shift the second trigger signal and output the second sub-drive signal.

3. The display panel of claim 2, wherein the display panel comprises a first trigger signal line and a second trigger signal line;

wherein the first trigger signal line is configured to provide the first trigger signal for the K-th stage of shift register, and the second trigger signal line is configured to provide the second trigger signal for the M-th stage of shift register.

4. The display panel of claim 3, wherein the first trigger signal line and the second trigger signal line satisfy at least one of:

a length of the first trigger signal line is greater than a length of the second trigger signal line; or a width of the first trigger signal line is greater than a width of the second trigger signal line.

5. The display panel of claim 1, wherein the display panel comprises an initial trigger signal line;

wherein the initial trigger signal line is configured to provide the initial trigger signal for the control circuit.

6. The display panel of claim 1, wherein the control circuit is configured to receive a first level signal and a second level signal, receive at least one of the initial trigger signal, a frequency control signal, or a trigger control signal, and output the first trigger signal or the second trigger signal, wherein a voltage value of the first level signal is greater than a voltage value of the second level signal; wherein the first control circuit satisfies at least one of: the frequency control signal received by the first control circuit is a first frequency control signal, or the trigger control signal received by the first control circuit is a first trigger control signal, and the first control circuit is configured to output the first trigger signal;

the second control circuit satisfies at least one of: the frequency control signal received by the second control circuit is a second frequency control signal, or the trigger control signal received by the second control circuit is a second trigger control signal, and the second control circuit is configured to output the second trigger signal; and a pulse change frequency of the first frequency control signal is Fc1, and a pulse change frequency of the second frequency control signal is Fc2, wherein $Fc1 \neq Fc2$.

7. The display panel of claim 6, wherein the control circuit comprises at least one of a first circuit, a second circuit, or a third circuit;

wherein the first circuit, the second circuit and the third circuit satisfy at least one of: the frequency control signal is used for controlling the first circuit;

the trigger control signal is used for controlling the second circuit; or the initial trigger signal is used for controlling the third circuit.

8. The display panel of claim 7, wherein the first circuit receives the first level signal and the second level signal and controls a signal of a first node and a signal of a third node in response to the frequency control signal;

the second circuit receives the signal of the first node and controls a signal of a second node in response to the trigger control signal;

the third circuit receives the signal of the second node and the second level signal and controls the signal of the third node in response to the initial trigger signal; and the third node is configured to output the first trigger signal or the second trigger signal.

9. The display panel of claim 8, wherein the first circuit comprises a first transistor and a second transistor;

wherein a first electrode of the first transistor receives the first level signal, a second electrode of the first transistor is connected to the first node, and a gate of the first transistor receives the frequency control signal; and a first electrode of the second transistor receives the second level signal, a second electrode of the second transistor is connected to the third node, and a gate of the second transistor receives the frequency control signal;

wherein the second circuit comprises a third transistor;

wherein a first electrode of the third transistor is connected to the first node, a second electrode of the third transistor is connected to the second node, and a gate of the third transistor receives the trigger control signal;

wherein the third circuit comprises a fourth transistor and a fifth transistor;

wherein a first electrode of the fourth transistor is connected to the second node, a second electrode of the fourth transistor is connected to the third node, and a gate of the fourth transistor receives the initial trigger signal; and a first electrode of the fifth transistor receives the second level signal, a second electrode of the fifth transistor is connected to the third node, and a gate of the fifth transistor receives the initial trigger signal.

10. The display panel of claim 9, wherein in a case where the first transistor is turned on, the second transistor is turned off; or in a case where the first transistor is turned off, the second transistor is turned on; and in a case where the fourth transistor is turned on, the fifth transistor is turned off; or in a case where the fourth transistor is turned off, the fifth transistor is turned on.

11. The display panel of claim 9, wherein the first transistor is a P-type channel transistor, and the second transistor is an N-type channel transistor; or the first transistor is an N-type channel transistor, and the second transistor is a P-type channel transistor; and the fourth transistor is a P-type channel transistor, and the fifth transistor is an N-type channel transistor; or the fourth transistor is an N-type channel transistor, and the fifth transistor is a P-type channel transistor.

12. The display panel of claim 9, wherein the third transistor is a P-type channel transistor, or the third transistor is an N-type channel transistor.

13. The display panel of claim 7, wherein in a case where the first circuit of the first control circuit receives the first frequency control signal, the second circuit of the first control circuit receives the first trigger control signal; and in a case where the first circuit of the second control circuit receives the second frequency control signal, the second circuit of the second control circuit receives the second trigger control signal.

14. The display panel of claim 6, wherein the display panel comprises a first frequency control signal line and a second frequency control signal line;

wherein the first frequency control signal line is configured to provide the first frequency control signal for the first control circuit, and the second frequency control signal line is configured to provide the second frequency control signal for the second control circuit.

15. The display panel of claim 6, wherein the display panel comprises a frequency control signal line;

wherein in a case where the first driving portion outputs the first sub-drive signal, the frequency control signal line provides the first frequency control signal for the first control circuit; and in a case where the second driving portion outputs the second sub-drive signal, the frequency control signal line provides the second frequency control signal for the second control circuit.

16. The display panel of claim 6, wherein the display panel comprises a trigger control driver circuit configured to output the trigger control signal; wherein the first trigger control signal is an x-th stage of output signal outputted by the trigger control driver circuit, and the second trigger control signal is a y-th stage of output signal outputted by the trigger control driver circuit, wherein x≥1, and y≥1;

wherein an effective pulse stage of the x-th stage of output signal acting on the first control circuit does not overlap an effective pulse stage of the y-th stage of output signal acting on the second control circuit.

17. The display panel of claim 16, wherein the display panel further comprises a second driver circuit configured to provide a second drive signal for the pixel circuit; wherein the second driver circuit also serves as the trigger control driver circuit, and the second drive signal also serves as the trigger control signal.

18. A display panel, comprising:

a first driver circuit and a pixel circuit, wherein the first driver circuit is configured to provide a first drive signal for the pixel circuit, wherein the first drive signal comprises a first sub-drive signal and a second sub-drive signal;

wherein the first driver circuit comprises a first driving portion and a second driving portion;

wherein the first driving portion comprises a K-th stage to an L-th stage of shift registers and is configured to output the first sub-drive signal, and the second driving portion comprises an M-th stage to an N-th stage of shift registers and is configured to output the second sub-drive signal, wherein K≥1, L≥1, M≥1, and N≥1; and a pulse change frequency of the first sub-drive signal is F1, and a pulse change frequency of the second sub-drive signal is F2;

wherein F1≠F2, wherein the display panel comprises an initial trigger signal line;

wherein the initial trigger signal line is configured to provide the first trigger signal for the K-th stage of shift register and provide the second trigger signal for the M-th stage of shift register.

19. A display device, comprising a display panel, wherein the display panel comprises:

a first driver circuit and a pixel circuit, wherein the first driver circuit is configured to provide a first drive signal for the pixel circuit, wherein the first drive signal comprises a first sub-drive signal and a second sub-drive signal;

wherein the first driver circuit comprises a first driving portion and a second driving portion;

wherein the first driving portion comprises a K-th stage to an L-th stage of shift registers and is configured to output the first sub-drive signal, and the second driving portion comprises an M-th stage to an N-th stage of shift registers and is configured to output the second sub-drive signal, wherein K≥1, L≥1, M≥1, and N≥1; and a pulse change frequency of the first sub-drive signal is F1, and a pulse change frequency of the second sub-drive signal is F2;

wherein F1≠F2, wherein the display panel comprises a control circuit receiving at least an initial trigger signal;

wherein the control circuit comprises a first control circuit and a second control circuit; wherein the first control circuit and the second control circuit satisfy at least one of:

the first control circuit is configured to receive at least the initial trigger signal and output a first trigger signal, and an output terminal of the first control circuit is connected to the K-th stage of shift register and is configured to provide the first trigger signal for the K-th stage of shift register; or the second control circuit is configured to receive at least the initial trigger signal and output a second trigger signal, and an output terminal of the second control circuit is connected to the M-th stage of shift register and is configured to provide the second trigger signal for the M-th stage of shift register.

* * * * *